US 6,555,977 B1

(12) United States Patent
Du et al.

(10) Patent No.: US 6,555,977 B1
(45) Date of Patent: Apr. 29, 2003

(54) DISK DRIVE MOTOR POSITION DETECTION USING MUTUAL INDUCTANCE ZERO CROSSING

(75) Inventors: Tan Du, Plano, TX (US); Robert E. Whyte, Jr., Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/626,624

(22) Filed: Jul. 27, 2000

(51) Int. Cl.⁷ .............................................. H02P 5/06
(52) U.S. Cl. ...................... 318/254; 318/138; 318/439; 310/184; 310/185
(58) Field of Search ................................ 318/138, 254, 318/439, 701, 696, 431; 310/179, 162, 166, 184, 185, 168, 90.5

(56) References Cited

U.S. PATENT DOCUMENTS

| | | | |
|---|---|---|---|
| 4,772,839 A | 9/1988 | MacMinn et al. | 318/696 |
| 5,028,852 A | 7/1991 | Dunfield | 318/254 |
| 5,057,753 A | 10/1991 | Leuthold et al. | 318/254 |
| 5,180,960 A * | 1/1993 | Austermann | 318/701 |
| 5,191,270 A | 3/1993 | McCormack | 318/254 |
| 5,202,614 A * | 4/1993 | Peters et al. | 318/138 |
| 5,202,616 A * | 4/1993 | Peters et al. | 318/254 |
| 5,245,256 A * | 9/1993 | Cassat et al. | 318/138 |
| 5,327,053 A | 7/1994 | Mann et al. | 318/254 |
| 5,343,127 A * | 8/1994 | Maiocchi | 318/254 |
| 5,382,889 A | 1/1995 | Peters et al. | 318/254 |
| 5,384,527 A | 1/1995 | Rozman et al. | 322/10 |
| 5,448,149 A * | 9/1995 | Ehsani et al. | 318/254 |
| 5,530,326 A | 6/1996 | Galvin et al. | 318/254 |
| 5,600,218 A | 2/1997 | Holling et al. | 318/439 |
| 5,717,298 A * | 2/1998 | Tang et al. | 318/254 |
| 5,767,654 A * | 6/1998 | Menegoli et al. | 318/138 |
| 5,811,905 A * | 9/1998 | Tang | 310/179 |
| 5,889,347 A * | 3/1999 | Tang et al. | 310/165 |
| 5,929,590 A * | 7/1999 | Tang | 318/701 |
| 5,990,643 A | 11/1999 | Holling et al. | 318/254 |
| 6,020,665 A * | 2/2000 | Maurio et al. | 310/90.5 |
| 6,078,122 A * | 6/2000 | Tang et al. | 310/165 |
| 6,163,120 A * | 12/2000 | Menegoli | 318/138 |

* cited by examiner

*Primary Examiner*—Rita Leykin
(74) *Attorney, Agent, or Firm*—W. Daniel Swayze, Jr.; W. James Brady; Frederick J. Telecky, Jr.

(57) ABSTRACT

The invention includes a method and apparatus for detecting the position of an electric motor rotor by sensing the zero crossing or polarity change of a mutual inductance associated with the motor. The use of mutual inductance provides for consistent position detection unaffected by motor speed or winding current, thus providing significant advantages over traditional back emf zero crossing detection methods. The mutual inductance zero crossing may be detected by measuring a voltage signal in a floating phase of the motor, filtering back emf and excitation components out of the measured voltage signal, and detecting a polarity change or zero crossing in the resulting mutual inductance signal.

21 Claims, 20 Drawing Sheets

DISK DRIVE MOTOR POSITION DETECTION USING MUTUAL INDUCTANCE ZERO CROSSING

TECHNICAL FIELD

This invention relates generally to the field of electric motor driving systems, and more particularly to a method and apparatus for detecting the rotor position of a mass storage device spindle motor using a mutual inductance zero crossing.

BACKGROUND OF THE INVENTION

Electric motors include a rotor and a stator having a plurality of wound field coils. Brushless DC motors are electronically commutated, wherein solid-state switching replaces the brushes and segmented commutators of traditional permanent magnet DC motors. Brushless motors may be of the variable reluctance, permanent magnet, or hybrid type. Variable reluctance brushless motors are characterized by having an iron core rotor follow or chase sequentially shifting magnetic fields of the stator coils to facilitate rotational motion of the rotor. Permanent magnet brushless motors are characterized by having the sequentially energized field coils attract or repel a permanent magnet rotor into rotational motion.

Electric motors are used to rotate loads in a variety of applications. One such application is in mass storage devices, such as hard disk drives. A hard disk drive generally includes a stack of rotating disks or platters and a spindle motor, which may be a salient pole brushless DC motor, for rotating the disks. The drive also includes one or more electromagnetic read/write heads which fly above the surface of the disks, an actuator motor (also known as a voice coil motor or VCM) which controls the positioning of the read/write heads, power circuitry to provide electrical power to the spindle and voice coil motors, circuitry for processing the data read from and/or written to the drive, and control circuitry to control the operation of the spindle and voice coil motors. The platters are typically rotated at a generally constant angular speed while the read/write heads read from or write to circular tracks on the platters. The mass storage device spindle motors are commonly multiple phase motors including a permanent magnet rotor and three electrical windings. The three electrical windings are related to the three phases of the motor. Three phase currents flow through the motor windings, typically at a 120 electrical degree phase relationship with respect to one another. The phase currents create a rotating electric field which causes angular rotation of the permanent magnet rotor.

The electromagnetic read/write heads read data from a disk platter by sensing flux changes on the magnetic surface of the platter as it passes beneath the read/write head. In order to synchronize the data being read from the disk with the operation of the data processing circuitry, it is necessary to carefully control the rotational speed of the disks. This is accomplished by controlling the current delivered to the spindle motor phase windings. The phase currents may be generated by the control circuitry in a variety of fashions. One method is to provide pulse-width-modulated (PWM) signals to the motor windings, wherein the timing of the individual PWM signals provided to each motor phase is determined by a control circuit. The duty cycle of the pulse width modulation signal therefore determines the average current delivered to the spindle motor. Another mode of current control is known as linear current control. The spindle motor control circuitry adjusts the level of current delivered by the power circuitry according to a desired motor performance parameter, such as speed and/or position.

Power is delivered to the motor phases through selectively energizing and de-energizing the individual phase windings. This process is known as commutation, and is accomplished via the control circuit. In order to rotate the disk drive motor in a given direction from startup and to maintain a desired rotational speed and torque at steady state, a commutation sequence or scheme is employed according to the present rotor position. This ensures that the proper phase windings are energized at appropriate times and polarities in order to provide the mutual attraction and/or repulsion between the phase windings and the rotor magnetic poles which results in the desired angular rotor motion.

To ensure proper rotational movement, it is essential to determine the position of the rotor with respect to the de-energized stator windings (or with respect to the energized windings). By knowing this position (sometimes referred to as commutation position), the stator windings can be energized in the appropriate sequence to create a revolving magnetic field in the motor to exert the desired rotational torque on the rotor. Rotor position has previously been detected by employing one or more transducers within the motor to sense the position of the rotor relative to the active stator windings.

However, the use of such transducers to determine commutation position has several drawbacks. First, these sensors increase production costs due to the need for sophisticated positional adjustment and increased wiring. Moreover, the space required for commutation position sensors is also a significant disadvantage in that valuable space is consumed within the motor housing. With an ever-increasing premium on space and cost efficiency, several attempts have been made to create sensorless commutation position feedback systems to replace the need for commutation position sensors within such motors.

The commutation control circuit is provided with rotor position information feedback (as well as rotor speed information), which is used to generate appropriate commutation signals for the motor windings. This position information may be obtained from some form of position sensor, or from measurements of back electromotive force (emf). Rotational position sensors include hall effect devices, magnetic sensors, optically encoded disks, resolvers, and other devices providing an indication of the relative positions of the rotor and stator to the control circuit via separate sensor signals. These devices, however, add to the cost and complexity of a motor, as well as occupying valuable physical space. Rotor position has also been heretofore determined or estimated based on a periodic measurement of back emf. However, the back emf in a motor winding varies as a function of motor current, and is thus an inaccurate measure of true rotor position. In addition, the back emf signal magnitude is proportional to the motor speed if the air gap flux is constant with respect to rotor position, and hence is difficult to measure at low motor speeds.

Conventional disk drive motors are commonly operated at approximately 5,200 rpm. However, the continuing trend in mass storage devices is toward higher data densities and faster data read and write access. As the data density (sometimes expressed in tracks per inch or TPI) increases in such devices, and as access times are reduced, higher motor speeds and improved speed control accuracy are desirable. For example, mass storage disk drive motor speeds of 7,200 have been introduced. Although conventional speed and position control methods are adequate for lower speeds and data densities, improvements are desirable in order to achieve higher rotational speeds as well as improved control accuracy for disk drive motors, without adding cost to the mass storage device. Accordingly, improved methods and systems for measuring rotor position are desirable to enable increased motor speed as well as improved motor control accuracy in high current, high speed, and/or high current change rate applications, which avoid or minimize the shortcomings of the back emf measurement techniques heretofore popular in motor control applications.

SUMMARY OF THE INVENTION

The present invention provides an improved sensorless apparatus and methodology for determining the rotor position in a polyphase electric motor which overcomes or minimizes the shortcomings of the prior art. The method includes measuring a mutual inductance associated with the motor, and determining rotor position according to the measured mutual inductance. For example, the inventors of the present invention have found that an equivalent mutual inductance of two energized phase windings in a three phase spindle motor passes through zero when a rotor pole or a rotor pole boundary is aligned with a third de-energized (e.g., floating) winding. Thus, the rotor position may be detected via correlating a detected zero crossing or polarity change in the mutual inductance with the position of a rotor pole.

In addition, it has also been found that the mutual inductance zero crossing does not vary with motor current or speed, as does the back emf signal zero crossing of such a floating phase winding. Thus, the employment of a mutual inductance zero crossing or polarity change measurement in determining the rotor position provides improved accuracy in both high current and/or low speed motor operation, over conventional back emf measurement methods and systems. This rotor position determination may be employed advantageously in motor commutation control circuits, such as are found in mass storage device spindle motor drive circuitry, although it will be appreciated that the invention finds utility in other applications as well.

According to one aspect of the present invention, there is provided a method of detecting rotor position in a polyphase electric motor, comprising measuring a mutual inductance in the motor and determining the rotor position according to the measured mutual inductance. Further in accordance with the invention, determining the rotor position according to the measured mutual inductance may comprise detecting a polarity change in the measured mutual inductance, and determining the rotor position according to the mutual inductance polarity change. The measurement of the mutual inductance may include measuring a voltage signal in a floating phase of the motor, removing low frequency components from the floating phase voltage signal, rectifying the filtered floating phase voltage signal, and filtering high frequency components out of the rectified phase voltage signal.

The floating phase voltage signal may include a back emf component, a mutual inductance component, and a high frequency excitation component. Filtering the low frequency components out of the floating phase voltage signal may remove the back emf component of the measured voltage signal, and filtering the high frequency components out of the rectified phase voltage signal may remove the excitation component of the measured voltage signal. The resulting signal may thus represent primarily the mutual inductance component, whereby detecting a polarity change in the measured mutual inductance may comprise detecting the minimum value of the resulting signal.

The method may further include correlating one of a rotor pole and a rotor pole boundary with the floating phase position according to the mutual inductance polarity change. In this way, an accurate rotor position determination can be made independent of the motor current, thereby enabling higher accuracy motor position and speed control. For example, the mutual inductance polarity change or zero crossing may be used to control a commutation circuit. Further in this regard, where the polyphase electric motor includes three phases, the voltage signal may be measured in a floating phase of the motor while the other two phase windings are energized. The measured mutual inductance in this case may be the equivalent mutual inductance of the energized motor phase windings with respect to the de-energized phase winding, which has been found to cross through zero when rotor poles and pole boundaries are aligned with the de-energized floating phase winding.

According to another aspect of the invention, an apparatus is provided for detecting rotor position in a polyphase electric motor. The apparatus may include a first circuit adapted to measure a mutual inductance in the motor, and a second circuit adapted to determine rotor position according to the measured mutual inductance. The second circuit may further be adapted to detect a polarity change in the measured mutual inductance and to determine the rotor position according to the mutual inductance polarity change. In addition, the first circuit may include a sensor adapted to measure a voltage signal in a floating phase of the motor, a high pass filter adapted to remove low frequency components from the floating phase voltage signal, a rectifier adapted to rectify the filtered floating phase voltage signal, and a low pass filter adapted to remove high frequency components from the rectified phase voltage signal. Accordingly, the second circuit may be further adapted to detect the minimum value of a signal from the low pass filter. The measured voltage signal may comprise a back emf component, a mutual inductance component, and an excitation component, wherein the high pass filter removes the back emf component of the measured voltage signal, and wherein the low pass filter removes the excitation component of the measured voltage signal.

In accordance with yet another aspect of the invention, there is provided a method of detecting rotor position in a polyphase electric motor, which includes measuring a back emf zero crossing in the motor, measuring a current in the motor, and determining the rotor position according to the measured back emf zero crossing and the measured current. The rotor position determination may further include correlating the measured back emf zero crossing with the measured current.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts. The invention is directed to a method and apparatus for sensorless detection of rotor position in a polyphase electric motor, which provides significant improvement over the previous rotor position detection art. In particular, a mutual inductance zero crossing or polarity change of the motor is measured and correlated to rotor position. Unlike back emf measurements heretofore used in determining rotor position, the motor mutual inductance does not vary with motor current, and is further unrelated to motor speed. Thus, the present invention provides for improved accuracy in rotor position determinations in high current, low speed, and/or high current change rate operation. While the various aspects of the invention are illustrated hereinafter with respect to certain motor winding configurations, it will be appreciated that the invention finds applications in association with other motor configurations, for example, delta wound motors, and the like.

Figure 1:
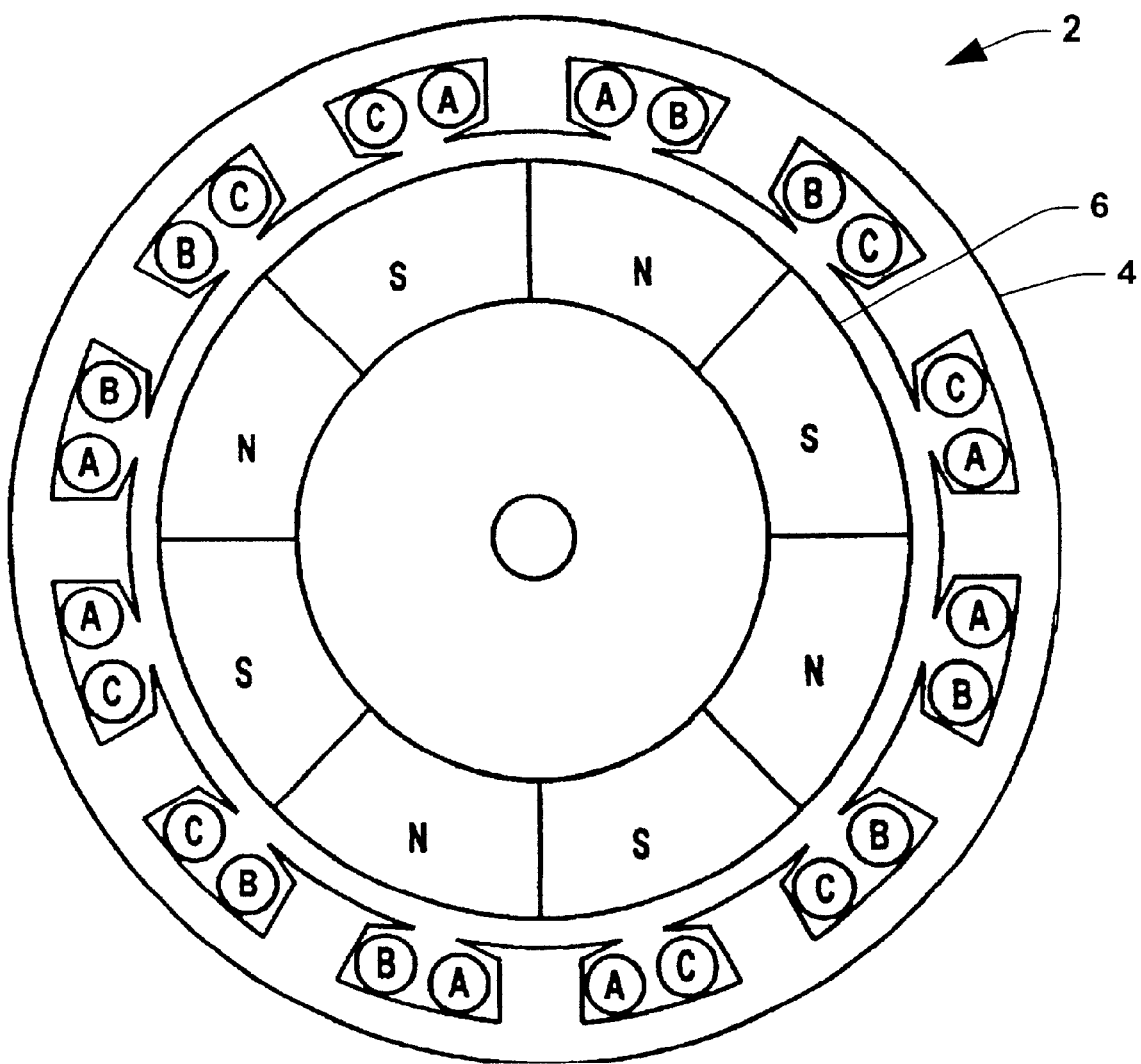
FIG. 1 is a sectional end elevation view of a polyphase electric motor having a permanent magnet rotor in which the principles of the present invention may be applied.

Referring now to FIG. 1, a typical polyphase motor 2 is illustrated having a stator 4 with a plurality of phase windings variously designated A, B, and C, which may be energized using corresponding phase taps (not shown) according to a commutation scheme. The commutation scheme may advantageously provide for appropriate windings A, B, and/or C to be energized at appropriate polarities such that mutual attraction and repulsion is provided between the resulting magnetic field and the permanent magnets of a rotor 6, having poles designated respectively as N and S. In this fashion, the rotor 6 may be made to rotate in a given angular direction in order to drive a load, such as a mass storage device platter.

Figure 2:
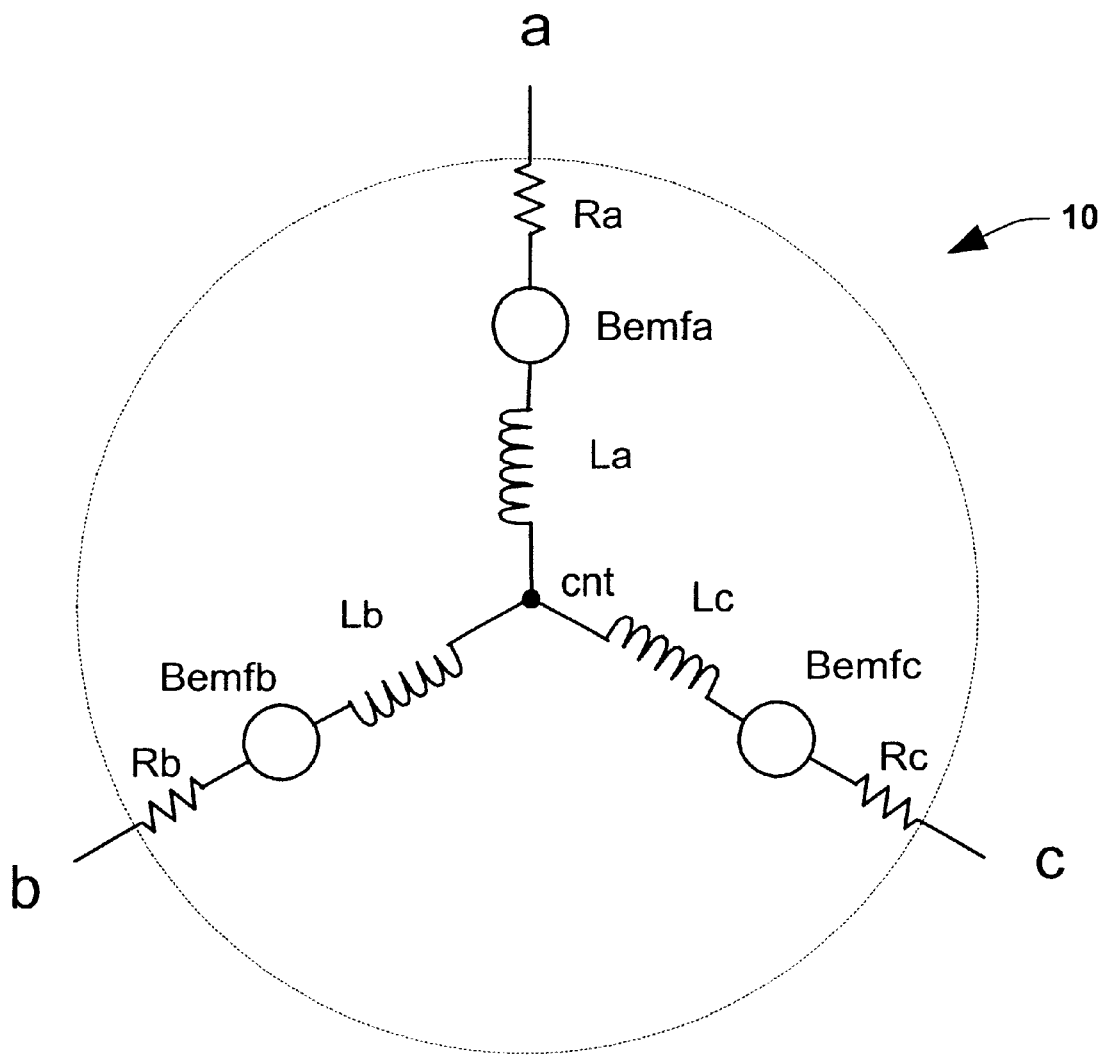
FIG. 2 is a schematic diagram illustrating a conventional three phase motor model.

FIG. 2 schematically illustrates a conventional three phase motor model 10 including phases a, b, and c having a resistance component, a back emf component, and a phase induction component, as well as a center tap cnt connecting the phases a, b, and c. For example, phase a includes a phase resistance Ra, a back electromotive force (emf) component Bemfa, and a phase inductance component La serially connected between phase tap a and the center tap cnt. In the past, the phase resistance components Ra, Rb, and Rc, as well as the phase inductance components La, Lb, and Lc have been assumed to be constant. In addition, it was previously assumed that the back emf components Bemfa, Bemfb, and Bemfc were a function of rotor speed only.

Many conventional sensorless rotor position detection methods accordingly included measuring the back emf in a floating phase, on the assumption that the rotor position could be accurately determined according to the zero crossing of the back emf waveform. However, in high current, low speed, and/or high current change rate applications, several discrepancies have been found by the inventors of the present invention between the model 10 and actual motor performance. In particular, the back emf has been found to be a function of current as well as speed, thus indicating that back emf sensing of the prior art is inadequate to determine rotor position in high accuracy applications, such as in improved mass storage device spindle motor control. In addition, significant mutual inductance components have been identified in actual motors, through which actual rotor position may be more accurately determined.

Figure 3A:
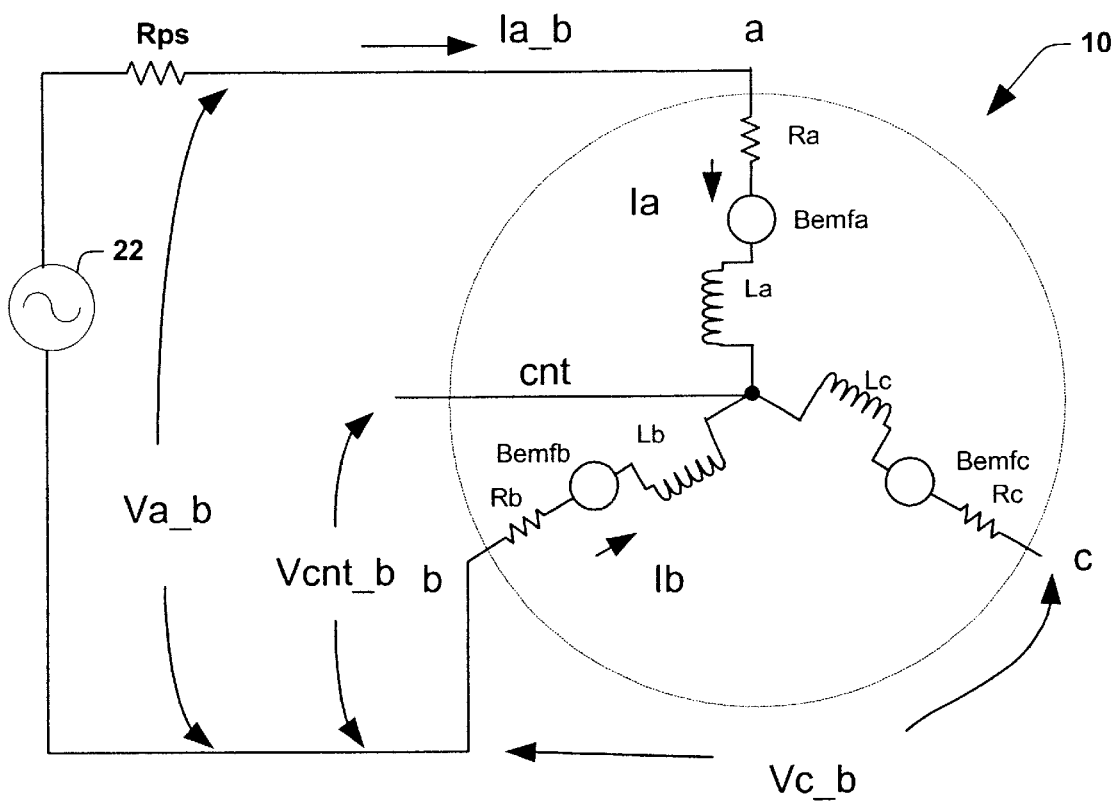
FIG. 3A is a schematic diagram illustrating a circuit for measuring the performance of a polyphase electric motor.

Referring now to FIG. 3A, a circuit 20 is illustrated for measuring the performance of or otherwise characterizing a polyphase electric motor. The circuit 20 includes a power source 22 with an output resistance Rps adapted to apply electrical power to two phases of an electric motor. In order to illustrate the shortcomings of the motor model 10 of FIG. 2, the power source 22 is connected to provide a voltage Va_b across phases a and b of motor model 10 while phase c is floated and the rotor is held stationary. The application of voltage Va_b causes current Ia_b (e.g.,=Ia=-Ib, as illustrated in FIG. 3A) to flow. Because the rotor is not moving, the back emf component Bemfc of the floating phase (e.g., phase c) is zero. Thus, according to the conventional model 10 of FIG. 2, the center tap voltage should be equal to one half of the applied phase to phase voltage Va_b, and the voltage between the center tap cnt and the floating phase tap c should be zero. However, the inventors of the present invention have found that this is not the case, as illustrated and described in greater detail hereinafter.

Figure 3B:
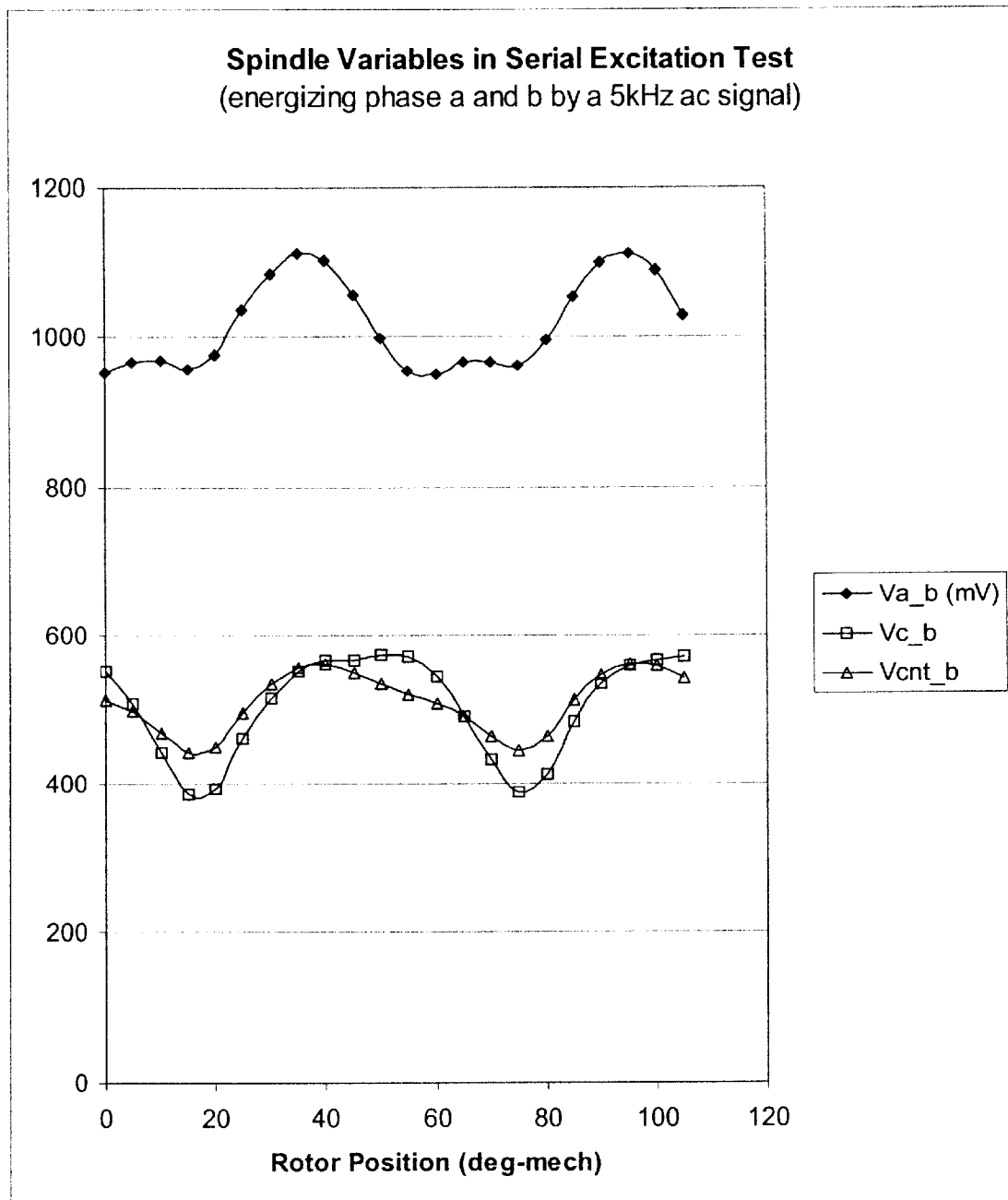
FIG. 3B is a graphical diagram illustrating three motor performance variables measured according to the circuit of FIG. 3A.

Referring also to FIG. 3B, a graph 30 illustrates the measured performance of a three phase spindle motor connected to the circuit 20 of FIG. 3A with respect to rotor position, wherein a 5 kHz current Ia_b has been applied to phases a and b while phase c is floated. The data was obtained at discrete rotor positions while the rotor itself was held stationary. It is noted from the graph 30 that the center tap voltage Vcnt_b is not one half of the phase voltage Va_b, but is instead variable with respect to the rotor position. In addition, the voltage between the center tap cnt and the floating phase tap c is not equal to zero, as would be expected from the conventional model 10. In particular, the model 10 leads one to expect that the voltage Vc_b between the floating phase c and the reference phase b minus the voltage Vcnt_b (Vc_b−Vcnt_b) would be zero since no back emf voltage exists in the floating phase c for a stationary rotor. However, as can be seen, the curves for Vc_b and Vcnt_b in FIG. 3B do not overlap. Consequently, the measurements of FIG. 3B show that the floating phase voltage varies with rotor position due to effects other than (or in addition to) back emf.

Figure 3C:
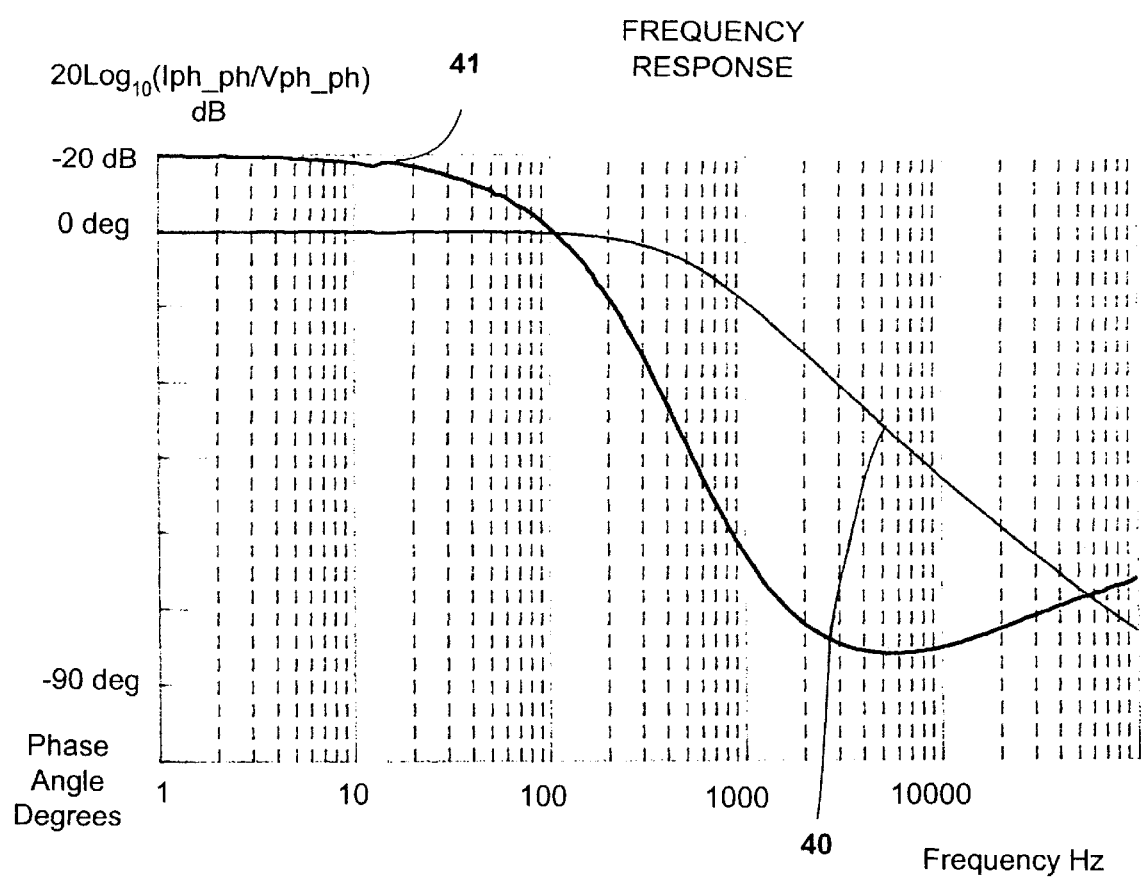
FIG. 3C is a Bode plot illustrating another motor performance variable measured according to the circuit of FIG. 3A.

In addition, the frequency response of an actual motor phase does not correlate with the conventional motor model 10. Referring to FIG. 3C, the inventors of the present invention measured the frequency response of a single phase (e.g., phase a, b, or c) of a motor by applying a phase to phase AC voltage Vph_ph (or phase to center tap voltage Vph_cnt) and measuring the resulting phase to phase current Iph_ph (or a phase to center tap current Iph_cnt) at various frequencies. The measurements were taken with floating phase a aligned with a rotor pole. The ratio 40 of the measured current (e.g., Ib_c) to the applied voltage (e.g., Vb_c) is plotted in FIG. 3C versus frequency, wherein the ratio is represented in dB (20×log$_{10}$ (Iph_ph/Vph_ph)) and the frequency axis is illustrated in a logarithmic scale. The phase relationship 41 between the applied voltage and the measured current is also plotted versus frequency.

The inventors of the present invention have thereby found that the Bode plot 40 of G(S)=Iph_ph/Vph_ph (or Iph_cnt/Vph_cnt) does not have a −20 dB per decade slope as would be expected from the model 10 of FIG. 2. Instead, the frequency response curve 40 has been found to have about a −17 dB per decade slope. In addition, the corner or 3 dB frequency of this frequency response curve has been found to be a function of the rotor position. Thus, the model 10 of FIG. 2 is inadequate to properly predict or simulate the actual behavior of polyphase motors in high accuracy control situations, such as high track density hard disk drive spindle motors.

Figure 3D:
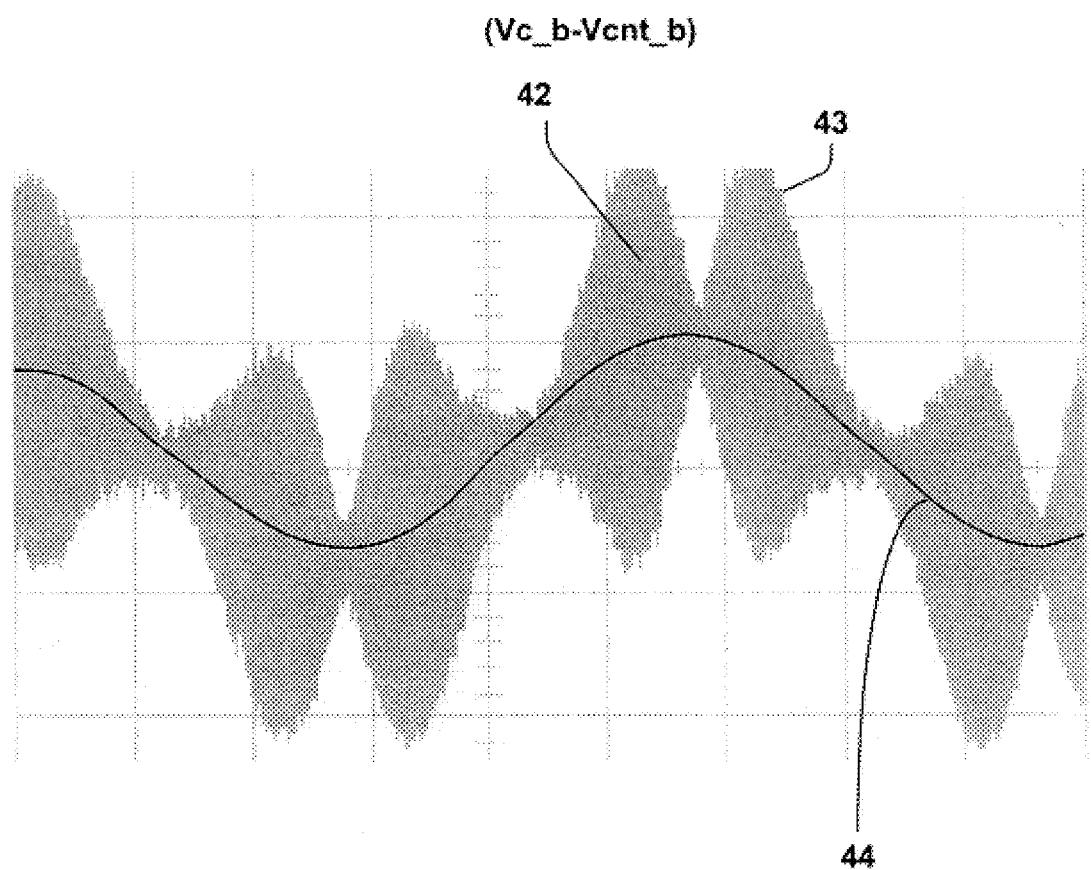
FIG. 3D is a graphical diagram illustrating another motor performance variable measured according to the circuit of FIG. 3A.

Referring also to FIG. 3D, a measurement of the voltage Vc_b−Vcnt_b is illustrated as a function of rotor position. The measurements illustrated in FIG. 3D were taken while the rotor was manually moved with phases a and b energized with a 5 kHz PWM signal and phase c floating. The waveform 42 was thus obtained, having a high frequency component in an envelope 43, riding along a low frequency sinusoidal curve 44. It will be noted that although the conventional model 10 suggests that the voltage Vc_b−Vcnt_b should be zero when there is no rotor movement, the measurements of FIG. 3D were taken while the rotor was moving. According to the conventional motor model 10, one would expect the voltage signal Vc_b−Vcnt_b to appear as a generally sinusoidal signal such as curve 44 (since the rotor is being manually rotated), corresponding solely to the back emf (e.g., Bemfc) associated with the floating phase. Once again, the conventional motor model 10 of FIG. 2 fails to simulate or predict this motor characteristic.

Figure 4A:
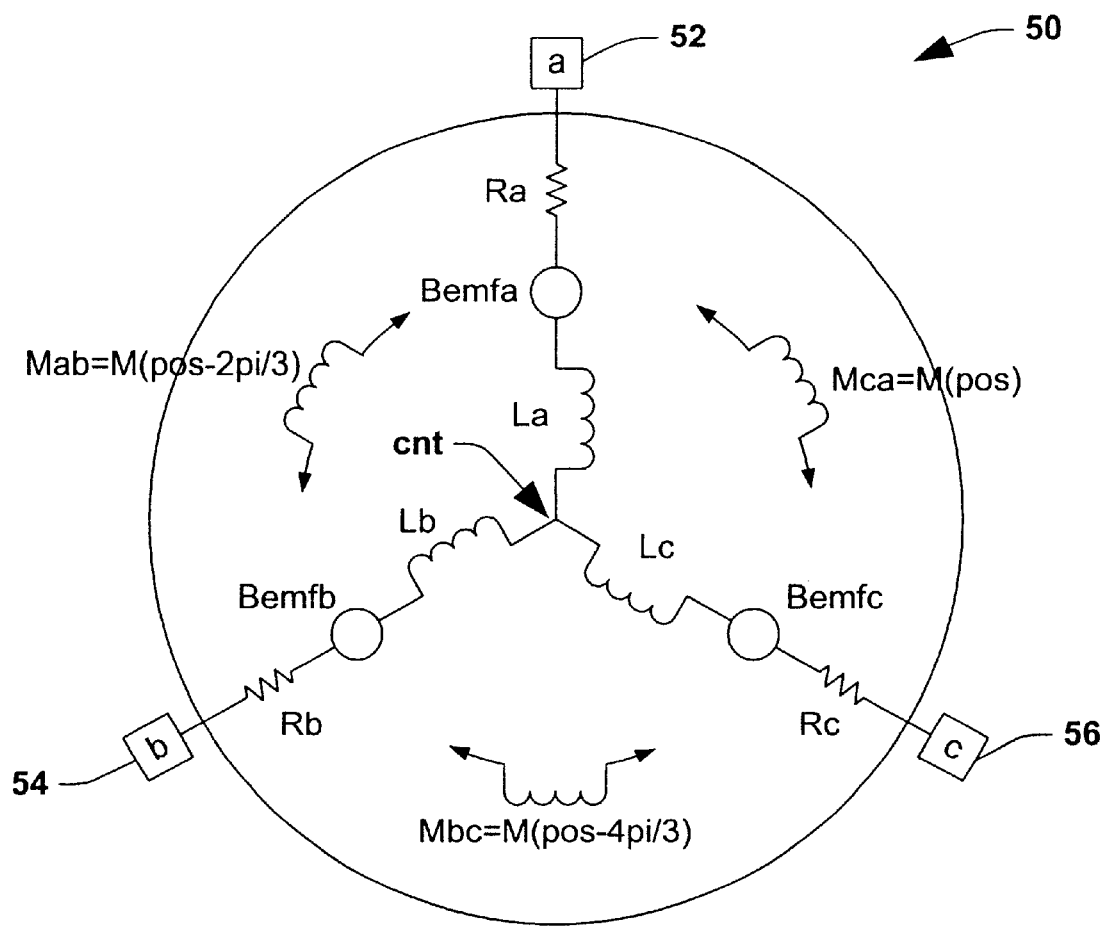
FIG. 4A is a schematic diagram illustrating an exemplary polyphase motor model in accordance with one aspect of the present invention.

Referring now to FIG. 4A, an exemplary model 50 of a polyphase electric motor is illustrated having phases a, b, and c extending between first ends joined at a center tap cnt and second ends extending outward from the center tap cnt to corresponding phase taps 52, 54, and 56. The model 50 further includes mutual inductance components Mab, Mca, and Mbc disposed between phases a and b, c and a, and b and c, respectively. As described hereinafter, the mutual inductance components Mab, Mca, and Mbc have been found to be a function of rotor position, having a 120 electrical degree phase relationship there between. The phases a, b, and c have a phase resistance component (e.g., Ra, Rb, and Rc, respectively), a back emf component (e.g., Bemfa, Bemfb, and Bemfc, respectively), and a phase inductance component (e.g., La, Lb, and Lc, respectively), serially connected between the corresponding phase tap and the center tap. In addition to the mutual induction components Mab, Mca, and Mbc, the phase inductance components have also been found to be a function of rotor position.

The model 50 provides a more accurate motor representation which provides insight into the actual motor performance characteristics illustrated in FIGS. 3B and 3D. In particular, the variation of the center tap voltage with respect to rotor position, and the deviation of the floating phase voltage from the back emf value as a function of the rotor position, are accounted for in the model 50, whereas the conventional model (e.g., model 10) did not explain this motor behavior. In many conventional applications, a motor phase may be "floated" for a certain time period, during which the voltage across the floating phase is measured to sense the back emf (e.g., Bemfa). Such schemes derive a rotor position measurement by sensing the zero crossing of the back emf signal. However, the inventors of the present invention have found that the floating phase voltage is not solely related to back emf, and further that the back emf varies as a function of motor current.

Figure 4B:
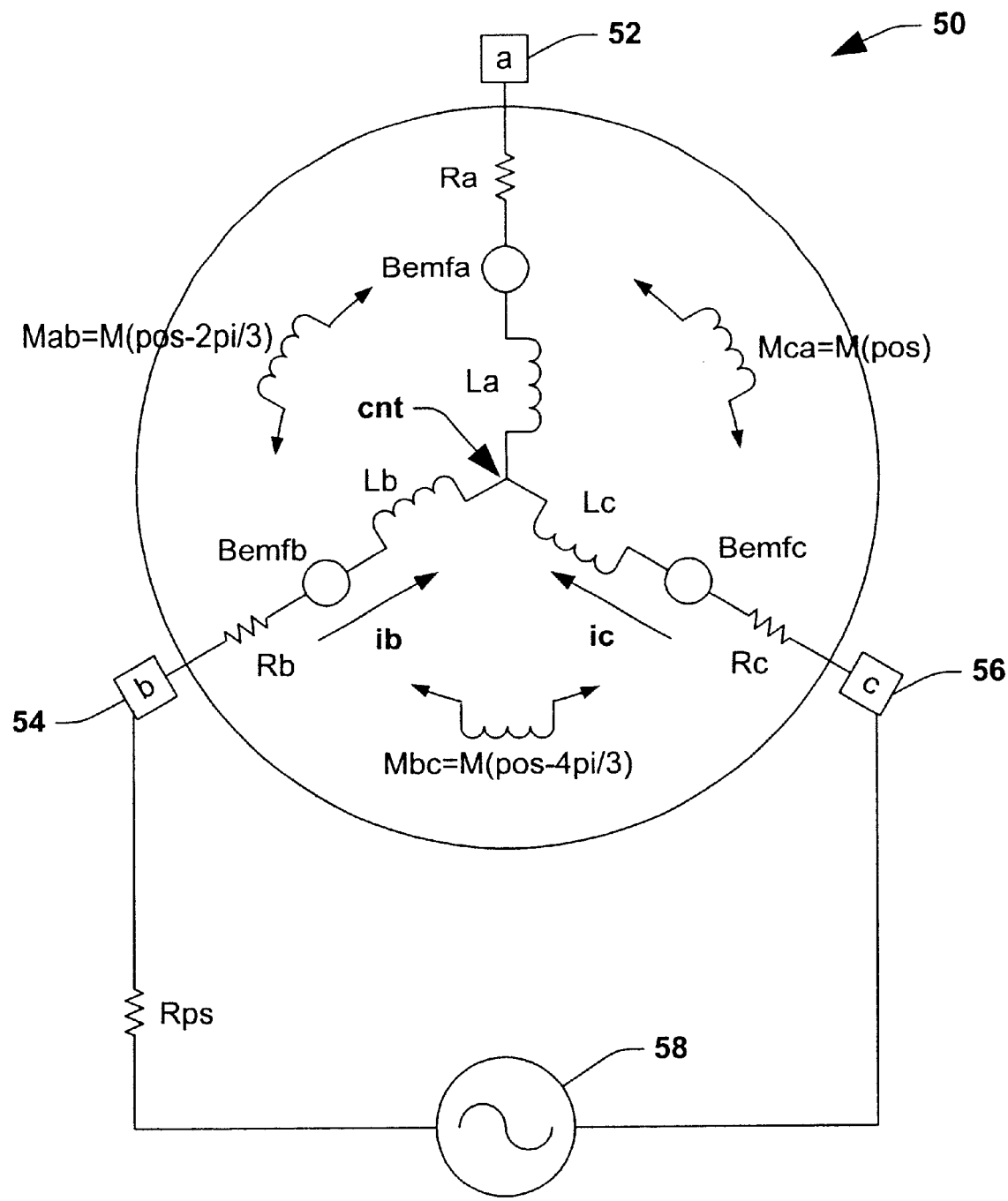
FIG. 4B is a schematic diagram illustrating a test circuit including the exemplary polyphase motor model of FIG. 4A.

Referring now to FIG. 4B, it has been found by the inventors of the present invention that the phase to phase mutual inductance components Mab, Mca, and Mbc vary with the rotor position due to variations in the reluctance in the path of the motor air gap flux between the rotor and stator. This is because, although the phase windings in the exemplary motor 2 of FIG. 1 are 120 electrical degrees apart, they are physically proximate one another in accordance with the stator winding pattern or configuration. Assuming zero rotor speed, the model 50 may be used to verify the measurements of FIG. 3B. As illustrated in FIG. 4B, an AC power source 58 is connected between phases b and c using phase taps 54 and 56, respectively, causing currents ib and ic to flow. The voltage across taps 54 and 56 is given by the following equation according to the model 50:

$$V_{bc} = V_{b\_cnt} - V_{c\_cnt}$$

where $V_{b\_cnt}$ is the voltage across phase b and $V_{c\_cnt}$ is the voltage across phase c. Considering the phase inductance components Lb and Lc as well as the mutual inductance component Mbc, the above equation may be rewritten as follows:

$$V_{bc}=(i_b R_b+L_b di_b/dt-M_{cb}di_c/dt)-(i_c R_c+L_c di_c/dt-M_{bc}di_b/dt).$$

Since $i_b=-i_c=i$, and assuming $R_b=R_c=R$, the equation may be simplified and rewritten as follows:

$$V_{bc}=i(2R)+(L_b+L_c+2M_{bc})di/dt,$$

where the term $(L_b+L_c+2M_{bc})$ is the motor phase to phase inductance.

In addition, since the rotor speed is assumed to be zero, the floating phase back emf (e.g., Bemfa) may be assumed to be zero as well. Due to the phase to phase mutual inductance components Mab and Mca, the floating phase voltage may be written as:

$$V_{a\_cnt}=-M_{ab}di_b/dt-M_{ca}di_c/dt$$

$$=-M_{ab}di/dt-M_{ca}d(-i)/dt$$

$$=(M_{ca}-M_{ab})di/dt$$

$$M_{a\_bc}di/dt$$

where $M_{a\_bc}=M_{ca}-M_{ab}$ is the equivalent mutual inductance of the two conducting phases b and c with respect to the floating phase a. Thus the floating phase voltage $V_{a\_cnt}$ is zero (assuming the rotor speed and hence the back emf Bemfa is zero, and that the di/dt is non-zero) when $M_{a\_bc}$ is zero, i.e. when $M_{ab}=M_{ca}$. However, this is true only when either the magnet pole of the permanent magnet rotor (e.g., rotor 6 of FIG. 1) is aligned with a floating phase winding (e.g., phase a), or when the mid point between adjacent rotor magnet poles is aligned with such a phase winding.

Hence, while phase windings b and c are energized, the flux paths associated therewith will change as the rotor moves, resulting in a corresponding change in the reluctance of the air gap flux between the rotor and the stator. As the reluctance increases, the mutual inductance also increases. This is due to the saturating effect of the rotor magnet poles. When the magnet pole is proximate an energized winding where the phase current generates flux of the same polarity as the proximate rotor pole, the air gap flux tends to saturate, thereby reducing the magnetic effect of current flowing through the winding. When the pole moves away from the winding, the magnetic effect of the winding current is more pronounced. Thus, it will be appreciated to those skilled in the art that the mutual inductance components Mab, Mbc, and Mca of the motor model 50 vary with rotor position, due to the reluctance variation as the rotor position changes.

The model 50 therefore explains why the floating phase voltage measurements for actual motors is not equal to the back emf associated therewith, but instead is a function of rotor position due to the mutual inductance components Mab, Mbc, and Mca. The mutual inductance components of the model 50 account for the transformer effect of the changing reluctance in the motor air gap flux, caused by the relative position of the phase windings and the rotor magnet poles. Referring also to FIG. 3D, the mutual inductance components of the model 50 account for the transformer coupling of the PWM energy into the floating phase, which is superimposed on the lower frequency back emf waveform 44, whereby the composite signal 42 is measured at the motor terminals.

Figure 5A:
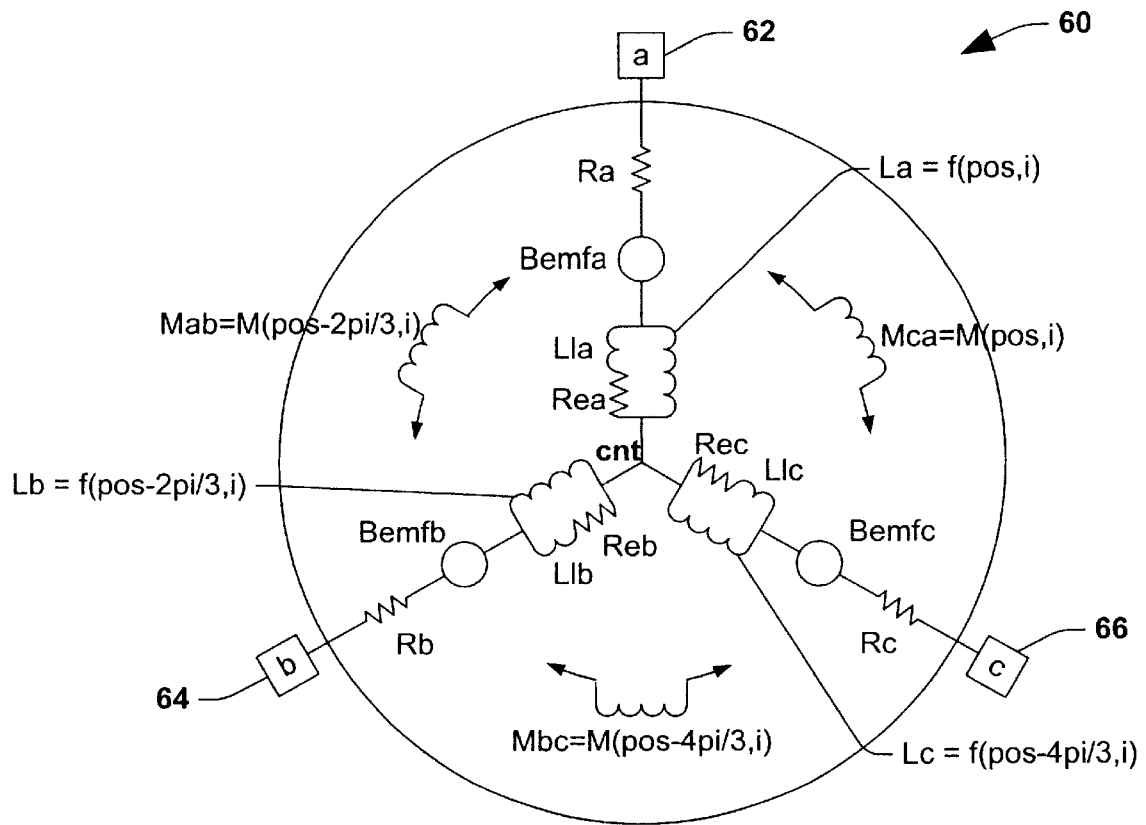
FIG. 5A is a schematic diagram illustrating another exemplary polyphase motor model in accordance with an aspect of the invention.

In addition to the mutual inductance components of the motor, the phase inductance components may also vary with rotor position. Referring now to FIG. 5A, another exemplary motor model 60 is illustrated having phases a, b, and c extending between first ends joined at a center tap cnt and second ends extending outward from the center tap cnt to corresponding phase taps 62, 64, and 66. The model 60 further includes mutual inductance components Mab, Mca, and Mbc disposed between phases a and b, c and a, and b and c, respectively. As described above, the mutual inductance components Mab, Mca, and Mbc vary according to rotor position, having a 120 electrical degree phase relationship there between. The mutual inductances Mab, Mca, and Mbc may further be a function of current. The phases a, b, and c have a phase resistance component (e.g., Ra, Rb, and Rc, respectively), a back emf component (e.g., Bemfa, Bemfb, and Bemfc, respectively), and a phase inductance component.

The phase inductance component may further comprise a phase inductance element (e.g., La, Lb, and Lc, respectively) which may be a function of rotor position and current, in parallel with the series combination of a leakage inductance element (e.g., Lla, Llb, and Llc, respectively), and an eddy current resistance element (e.g., Rea, Reb, and Rec, respectively). Referring again to the Bode plot of FIG. 3C, it will be appreciated that the conventional motor models (e.g., model 10 of FIG. 2) anticipated a frequency response curve having a fixed 3 dB or corner frequency and a −20 dB per decade slope, since the prior models assumed a single phase inductance (e.g., La, Lb, and Lc of FIG. 2). However, the measured motor frequency response indicates a corner frequency varying with rotor position, and about a −17 dB per decade slope. The parallel combination of the phase inductance element (e.g., La of model 60) with the leakage inductance element (e.g., Lla), and eddy current resistance element (e.g., Rea) in the model 60 of the present invention accounts for these positional and phase variations, since the leakage inductance element is a function of rotor position.

In the model 60, it will be appreciated that there are three different kinds of phase inductance elements or components in the motor, and two kinds of mutual inductance components. Lx is the phase inductance of phase x when the other phases (e.g., y and z) are floating, Lx_cnt (e.g., Lx+Mxy) is the phase x inductance when phases x and y are conducting and phase z is floating, and Lxy (e.g., Lx_cnt+Ly_cnt, or Lx+Ly+2Mxy) is the inductance between phases x and y when phases x and y are conducting and phase z is floating. The component Mxy is the mutual inductance between phases x and y, and $M_{z\_xy}$ is the equivalent mutual inductance of phases x and y to phase z when current is conducting from phase x to phase y while phase z is floating.

Further in this regard, it will be appreciated that the mutual inductance $M_{z\_xy}$ alternates between positive and negative values depending on the rotor position, whereas the other inductance and mutual inductance components have positive values. In particular, the mutual inductance zero crossing or polarity change may be advantageously employed to provide an indication of actual rotor position in accordance with an aspect of the present invention. Although the illustrations and description hereinafter illustrate exemplary methods and apparatus for detecting rotor position based on measurement of mutual inductance zero crossings or polarity changes, it will be appreciated by those skilled in the art that other inductance values (e.g., the phase inductance components or elements) of the motor which vary as a function of position may be measured and used to determine rotor position. In this regard, measurements may be made of minimums, maximums, waveform inflections, and other indicia which may be correlated to rotor position.

Figure 5B:
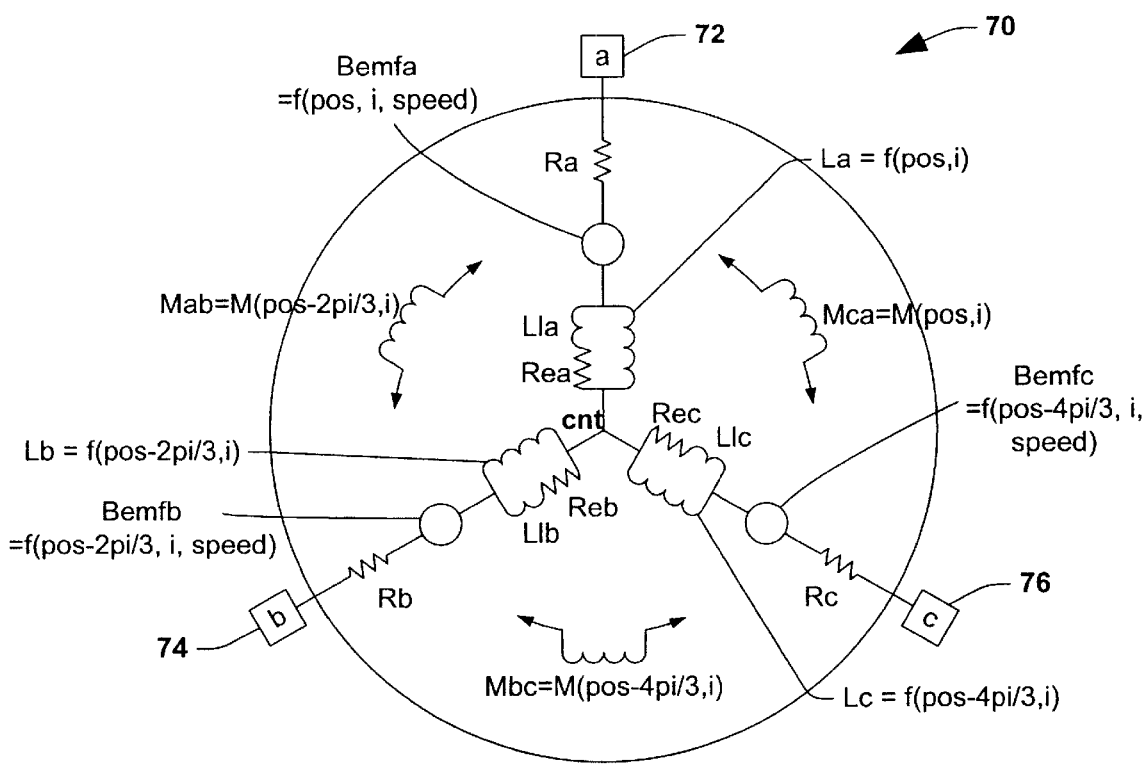
FIG. 5B is a schematic diagram illustrating another exemplary polyphase motor model in accordance with the invention.

In FIG. 5B, another exemplary motor model 70 is illustrated in which the back emf components Bemfa, Bemfb, and Bemfc are a function of rotor position, motor winding current, and speed. The inventors of the present invention have found that the back emf includes distortion at high speed, high current, and/or high current change rate (di/dt) operation due to this functionality, which renders the conventional motor model 10 inaccurate to predict motor behavior in such circumstances. The back emf is a voltage related to magnetic flux and the rotor speed. The inventors have found that this flux is related to both the permanent magnet poles of the rotor, as well as to the phase winding currents in the stator. As illustrated and described in greater detail herein above, the flux is further related to rotor position. Consequently, the back emf components Bemfa, Bemfb, and Bemfc are a function of rotor position, motor winding current, and rotor speed. Thus, the model 70 provides a more accurate representation of motor behavior than does the conventional model 10, for example, where back emf is measured in order to determine rotor position.

Figure 6:
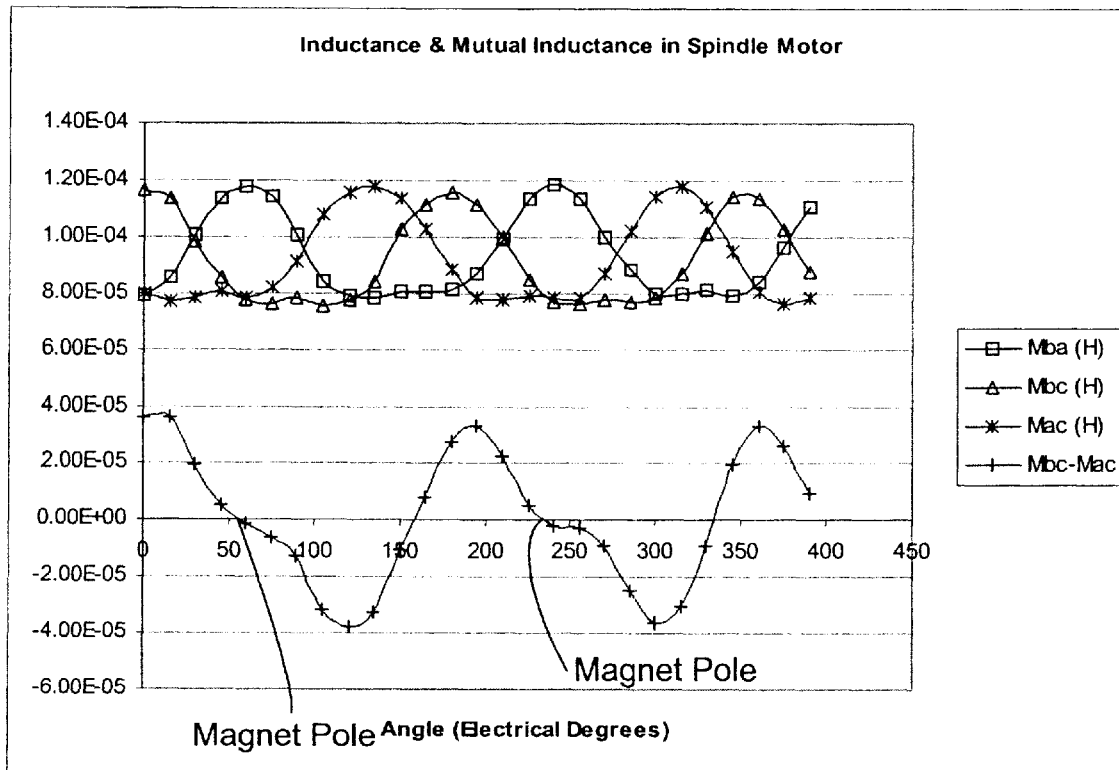
FIG. 6 is a graphical diagram illustrating four spindle motor mutual inductance variables as a function of rotor position.

Referring also to FIG. 6, the mutual inductances Mba, Mbc, and Mac are plotted as a function of rotor position in a mass storage device disk drive spindle motor, along with the equivalent mutual inductance Mbc–Mac. It is thus seen, for example, that the positional variation in the equivalent mutual inductance Mbc–Mac accounts for the difference between Vc_b and Vcnt_b in FIG. 3B (no rotor motion), as well as the measured high frequency signal 42 superimposed on the back emf signal 44 of FIG. 3D (rotor moving). In particular, the signal 42 includes a back emf component 44, a high frequency excitation component (e.g., related to a high frequency PWM excitation in the energized phase windings), and a mutual inductance component (e.g., the envelope of the high frequency excitation component).

It will be noted in this regard that where a motor phase (e.g., phase c) is floated (e.g., during position measurement in a commutation scheme), the equivalent mutual inductance component (e.g., Mbc–Mac) of the conducting phases (e.g., phases a and b) with respect to the floating phase (e.g., phase c) will pass through zero at four points in one electrical angular revolution of the rotor. In particular, the mutual inductance Mbc–Mac passes through zero where a rotor magnet pole is aligned with the floating phase, as well as where the floating phase is aligned with a pole boundary between adjacent rotor magnet poles. In accordance with one aspect of the invention, therefore, the zero crossing or polarity change of the mutual inductance may be used to determine the rotor position.

Figure 7A:
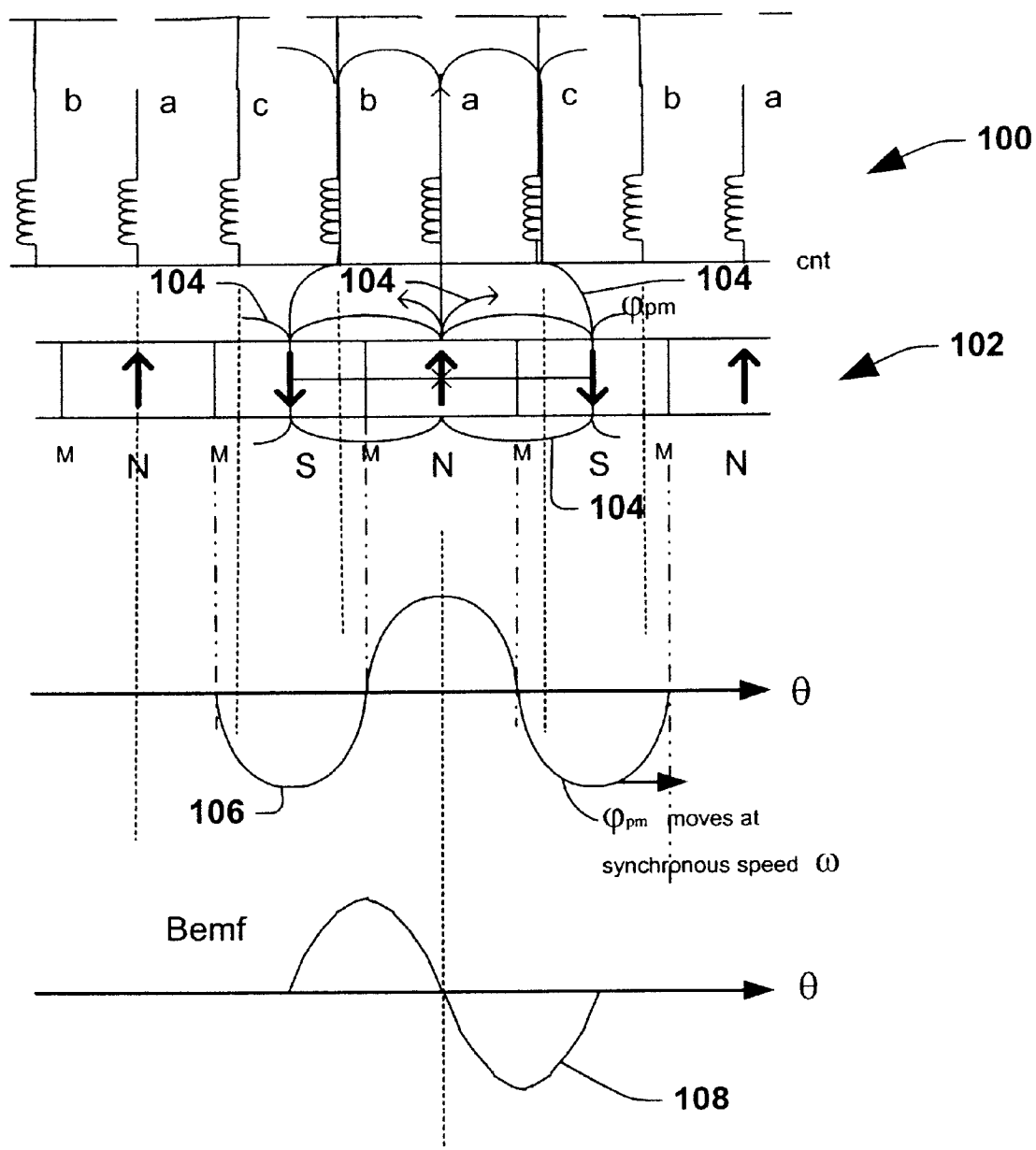
FIG. 7A is a schematic diagram illustrating electric motor permanent magnet flux and back emf as a function of rotor position with no phase currents.

Referring now to FIG. 7A, the inventors of the present invention have also determined that the zero crossing of a floating phase back emf signal does not accurately indicate the actual rotor position, as was assumed in prior position detection methods. It will be appreciated by those skilled in the art that the back emf is the result of changing magnetic flux in the air gap of a motor. Conventional sensorless rotor position detection methods and systems assume that the back emf zero crossing measured in a floating motor phase is strictly a function of rotor position, as the rotor moves.

However, the inventors of the present invention have found that the voltage measured across a floating motor phase is also a function of the product of motor current and speed. In addition, the floating phase voltage is a function of the product of mutual inductance and the change rate of the motor current di/dt. Consequently, the zero crossing of a measured floating phase voltage signal is not an accurate measure of the rotor position. As a simple example for intuitive understanding FIG. 7A schematically illustrates a motor having stator phase windings a, b, and c (designated collectively as 100), and alternating North and South magnetic rotor poles (designated collectively as 102).

Several exemplary magnetic flux lines 104 are illustrated, which are the result of the rotor permanent magnets 102. Thus, it will be appreciated that the air gap flux 106 ($\Phi_{pm}$) between the stator and the rotor due to the rotor permanent magnets will move with the rotor at the synchronous rotor speed ω. Were this permanent magnet flux $\Phi_{pm}$ the only source of air gap flux, the back emf 108 measured on a floating motor phase (e.g., phase a) would generally appear as a sinusoidal waveform with a zero crossing where a permanent magnet rotor pole was aligned with the floating phase a.

Figure 7B:
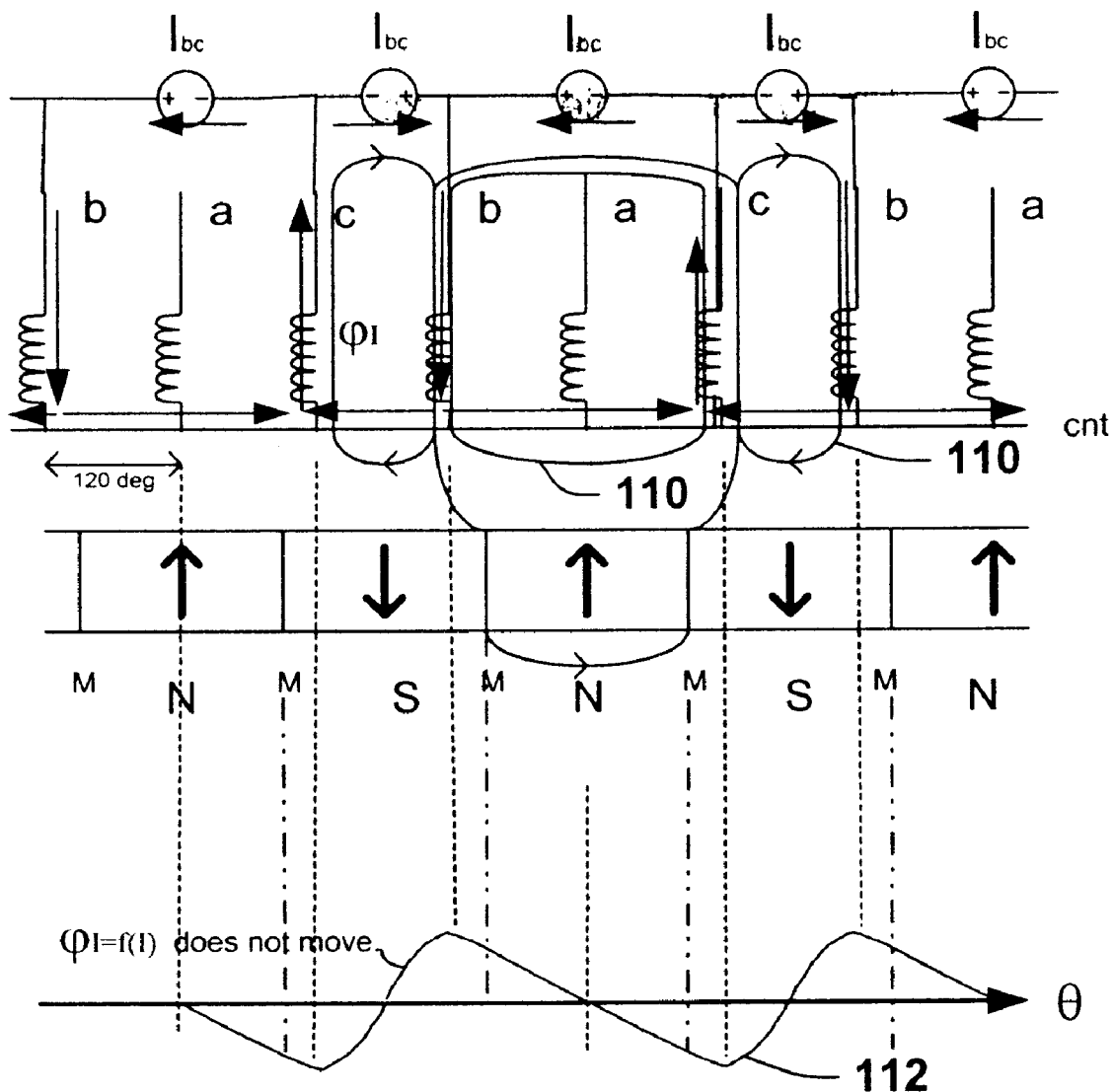
FIG. 7B is a schematic diagram illustrating electric motor flux resulting from phase currents.

However, the motor currents through energized phase windings also contribute to the total air gap flux $\Phi_a$. For example, FIG. 7B illustrates a motor having phases b and c energized and phase a de-energized or floating. The magnetic flux lines 110 are the product of the phase currents through windings b and c. The current related flux 112 $\Phi_i$ is illustrated versus rotor position θ. It will be noted that the flux $\Phi_i$ does not move with the rotor, but is instead a function of the stator phase winding pattern.

Figure 7C:
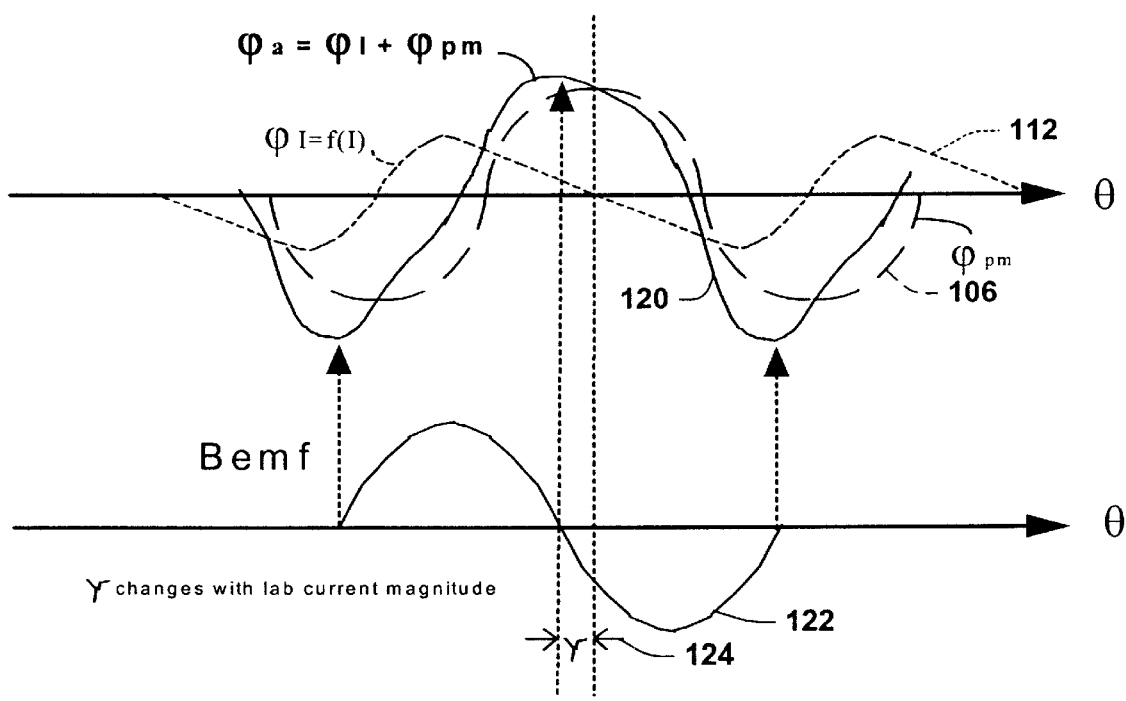
FIG. 7C is a graphical illustration of the total motor air gap flux resulting from both permanent magnet flux and current generated flux, together with back emf as a function of rotor position.

Referring now to FIG. 7C, the total motor air gap flux 120 $\Phi_a = \Phi_i + \Phi_{pm}$ at the de-energized or floating phase winding is plotted versus rotor position θ, along with the permanent magnet flux $\Phi_{pm}$ 106 and the current related flux $\Phi_i$ 112. Because the current related flux $\Phi_i$ 112 is not symmetrical with respect to the floating phase (e.g., phase a), the total air gap flux $\Phi_a$ 120 has a maximum which is angularly offset from the floating phase. Thus, the back emf 122 (e.g. d$\Phi_a$/dt) does not pass through zero when the rotor magnetic pole is strictly aligned with the floating phase winding, as was assumed in previous rotor position detection methods. Therefore, it will be appreciated that the back emf zero crossing does not accurately indicate the true rotor position.

Moreover, it is noted that since the current related flux $\Phi_i$ 112 is proportional to the motor phase winding current (e.g., through energized phases b and c), the offset γ 124 is consequently also proportional to the stator phase currents. As a result, where the rotor position is to be measured while phase winding currents are flowing, the back emf zero crossing does not occur where a rotor magnetic pole is aligned with a floating phase winding, as was assumed in the prior art. In addition, the inaccuracy of the back emf zero crossing measurement method gets worse as the motor current increases. Thus, where the load on a motor changes, a rotor position determination based on back emf measurement also changes. According to another aspect of the present invention, rotor position may be determined through a correlation between a measured back emf zero crossing and motor current.

In addition to the current dependency, the magnitude of the back emf is also dependent upon the motor speed. As the motor speed decreases, the back emf signal becomes smaller and smaller. Thus, it becomes more difficult to measure the back emf at very low motor speeds. Signal to noise ratios may become correspondingly smaller as well. Thus, at low motor speeds, and/or high motor currents, the measurement of back emf in order to determine rotor position is inadequate where high accuracy control is desired.

Referring again to FIG. 6, the equivalent mutual inductance Mbc–Mac of two energized phase windings with respect to a floating phase varies as a function of rotor position. Unlike the back emf, the mutual inductance zero crossing does not vary with current, and furthermore is not a function of rotor speed. According to an aspect of the present invention, a mutual inductance of a polyphase electric motor may thus be advantageously measured in order to determine the rotor position.

Referring as well to FIG. 3D, the floating phase voltage signal (e.g., Vc_b–Vcnt_b) includes a high frequency excitation component 42 due to the di/dt of the high frequency PWM phase currents in the conducting phases a and b multiplied by the mutual inductance, a mutual inductance component which appears as the envelope 43 modulated by the excitation component, and a back emf component 44. As illustrated and described above, measurement of the floating phase voltage signal zero crossing alone does not provide an accurate indication of the rotor position. However, measurement of the zero crossings or polarity changes in the mutual inductance component (e.g., the envelope 43 of FIG. 3D) of the floating phase voltage signal (or any type of indicia, inflection, maximum, etc. in any of the motor inductances which vary as a function of rotor position) provides rotor position information which is accurate even for high motor currents, low or zero motor speeds, and/or high current change rates because these mutual inductance zero crossings have not been found to vary with current, speed, and/or current change rate. In particular, as illustrated and described herein above, the mutual inductance zero crossings or polarity changes will occur when one of a rotor magnetic pole and a pole boundary is aligned with a de-energized or floating phase winding.

Figure 8A:
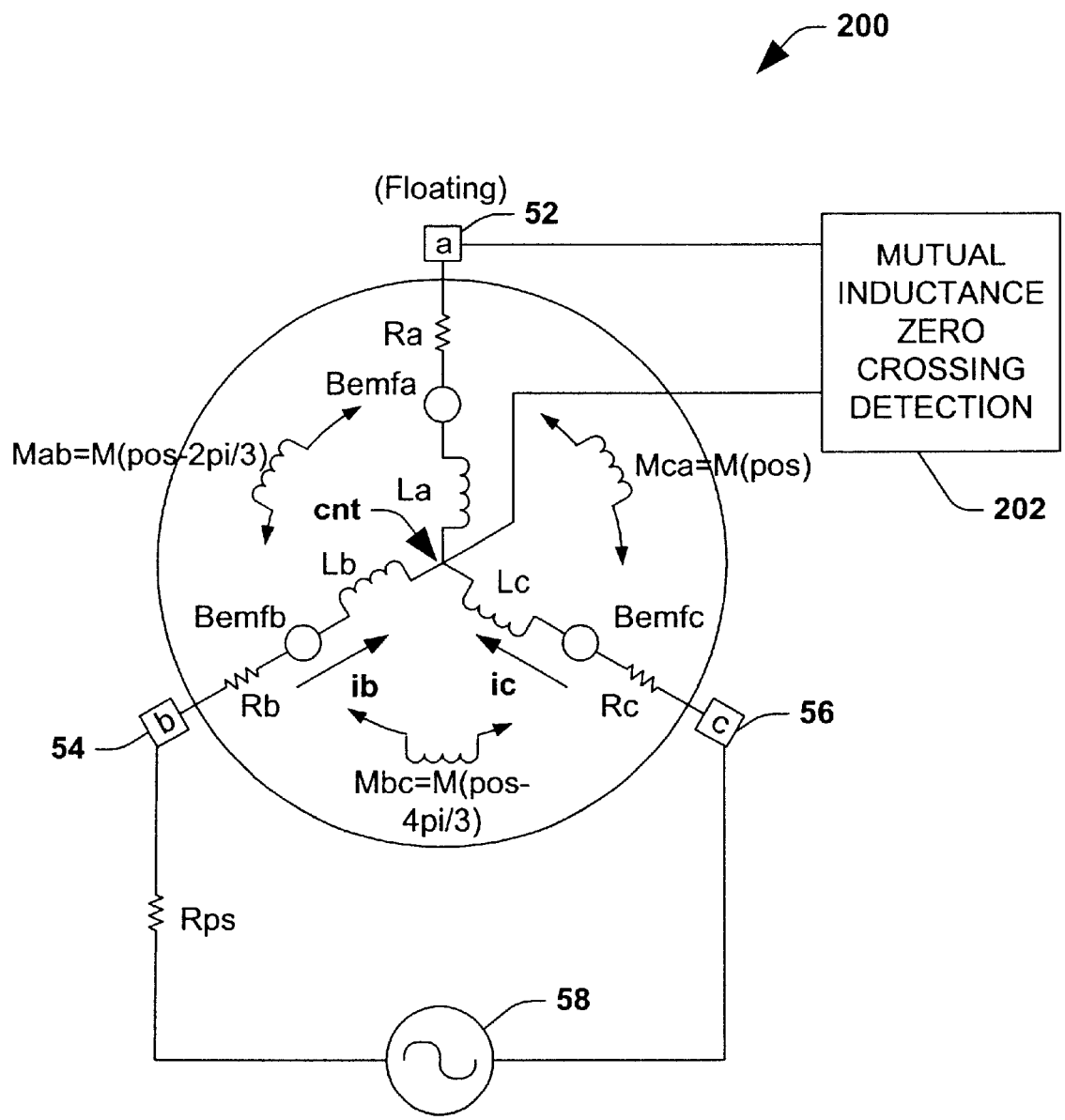
FIG. 8A is schematic diagram illustrating an exemplary apparatus for detecting rotor position in a polyphase electric motor in accordance with an aspect of the invention.

Referring now to FIG. 8A, an exemplary apparatus 200 is illustrated for detecting rotor position in a polyphase electric motor. The apparatus 200 includes a mutual inductance zero crossing detection component 202 adapted to detect a zero crossing or polarity change in a motor mutual inductance. For example, the voltage Va–Vcnt across a floating motor phase (e.g. phase a) may be measured while phases b and c are energized and while phase a is de-energized. Thus, a voltage signal may be obtained (e.g., from the floating phase a of FIG. 8A) having an excitation component, a back emf component, and a mutual inductance component (e.g., signal 42 of FIG. 3D).

Although the apparatus 200 advantageously determines the polarity of a floating phase voltage, it will be appreciated that the polarity change or zero crossing of such a floating phase voltage signal may be correlated with a corresponding polarity change or zero crossing in a motor mutual inductance, for example, the equivalent mutual inductance of a floating phase winding with respect to two energized windings. The equivalent mutual inductance zero crossing detected by the component 202 may thus be correlated with the alignment of a rotor magnet pole or pole boundary with the de-energized or floating phase a winding, whereby the rotor position may be accurately determined.

Figure 8B:
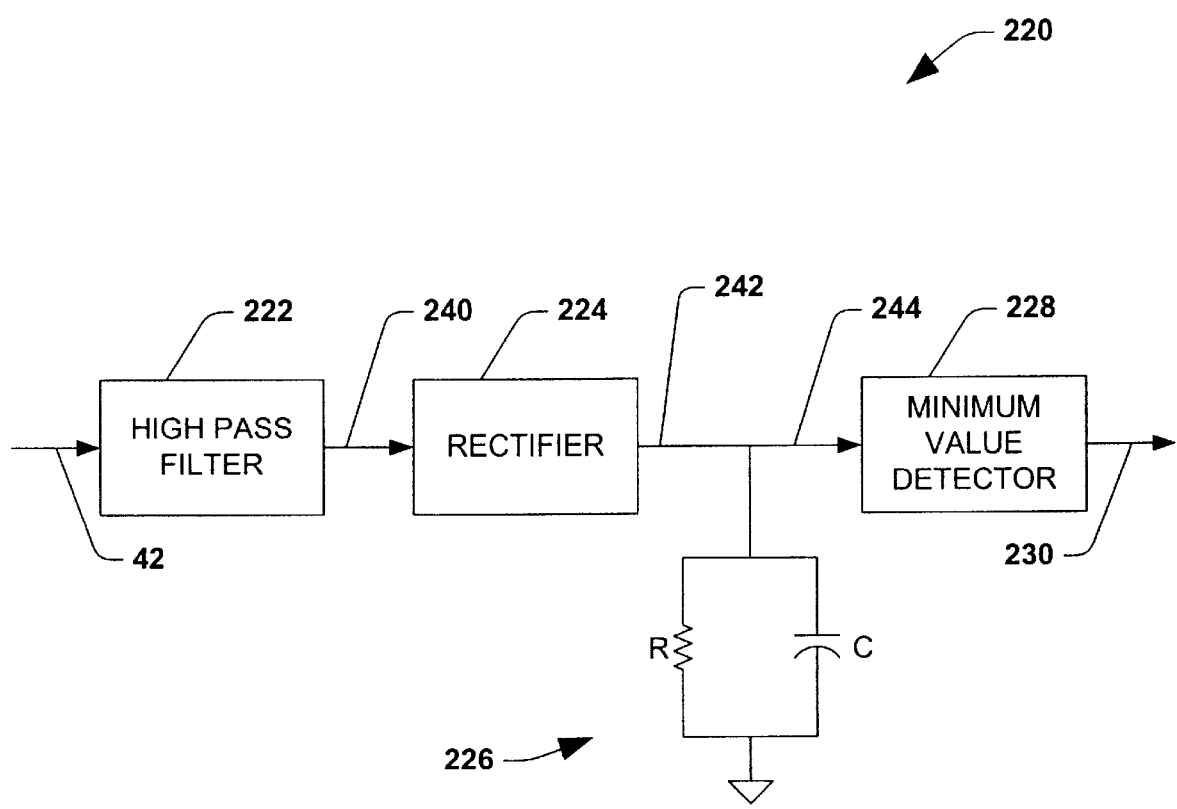
FIG. 8B is a schematic illustration of an apparatus for detecting mutual inductance phase reversal or zero crossing in accordance with another aspect of the invention.
Figure 8C:
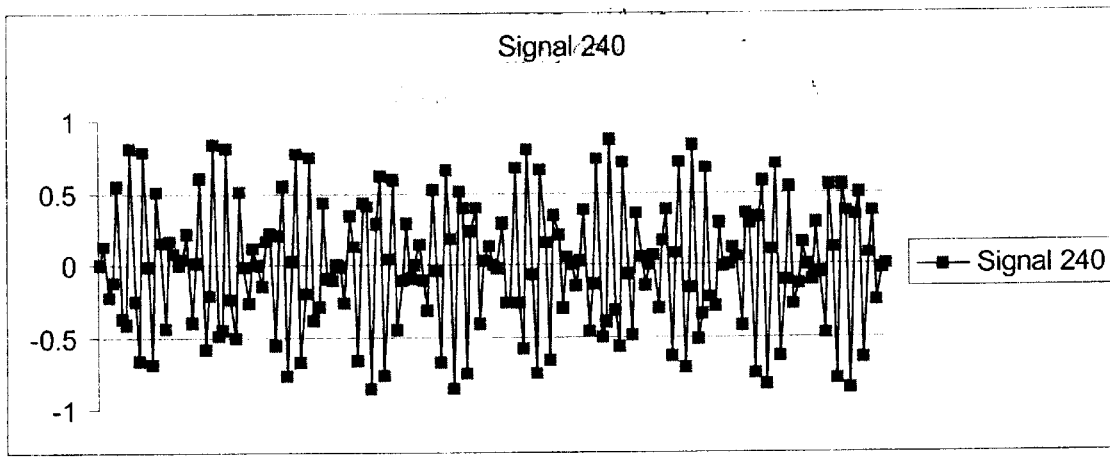
FIG. 8C is a graphical illustration of an exemplary signal obtained in the apparatus of FIG. 8B.
Figure 8D:
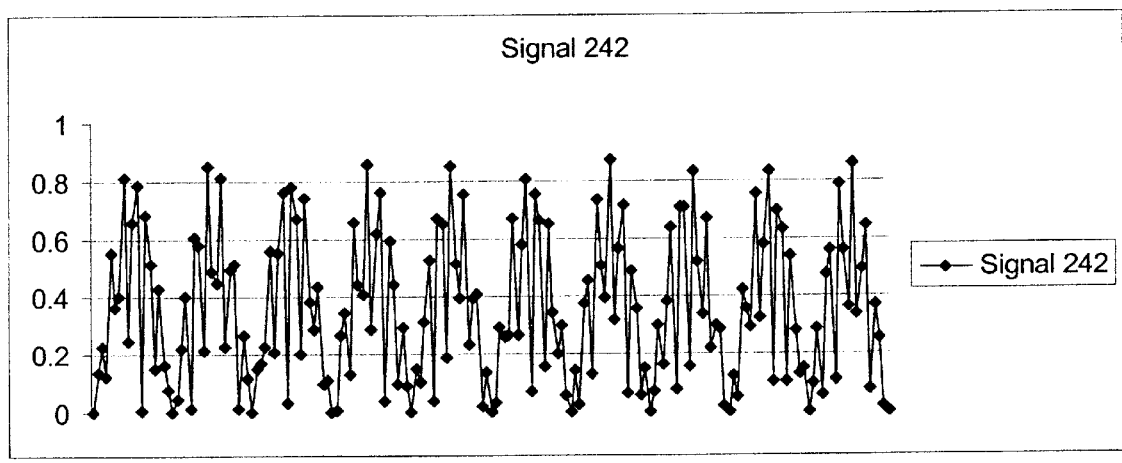
FIG. 8D is a graphical illustration of another exemplary signal obtained in the apparatus of FIG. 8B.
Figure 8E:
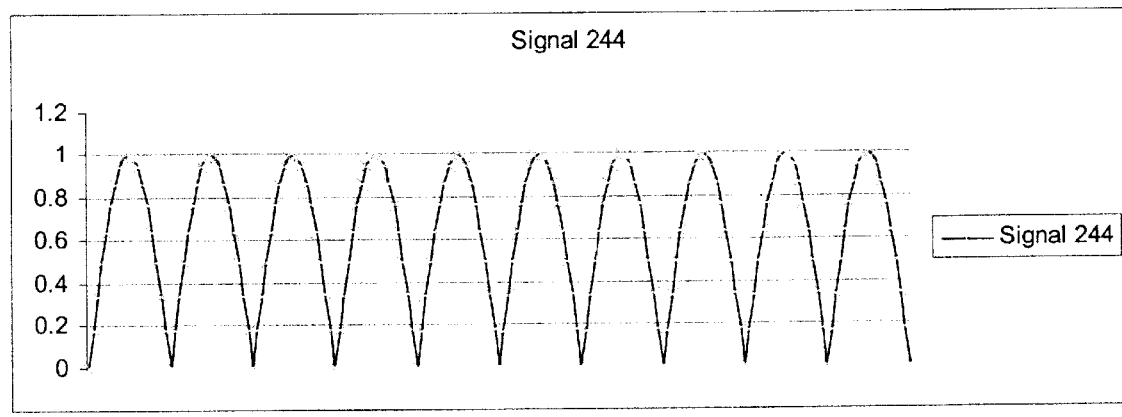
FIG. 8E is a graphical illustration of another exemplary signal obtained in the apparatus of FIG. 8B.

Referring also to FIG. 8B, an exemplary apparatus 220 is illustrated for detecting the mutual inductance phase reversal or zero crossing in accordance with another aspect of the invention. The apparatus 220 receives a floating phase voltage signal (e.g. signal 42 of FIG. 3D) from a polyphase motor, which may comprise a low frequency back emf component (e.g., back emf signal 44), along with a high frequency excitation component and a mutual inductance component (e.g., component 43). Such a composite signal (e.g., signal 42) may thus be presented to a high pass filter 222 wherein the low frequency back emf component 42 is filtered out. Referring also to FIGS. 8C–8E, several exemplary intermediate signals 240, 242, and 244 are illustrated corresponding to the outputs of components 222, 224, and 226, respectively, of apparatus 220. The signals 240, 242, and 244 illustrate the operation of the apparatus 220 in removing various components of an input signal (e.g., signal 42), and are not necessarily to scale. The signal 240 obtained from the high pass filter 222 may be rectified in a rectifier 224 to generate signal 242. Thereafter, signal 242 may be filtered by a low pass filter 226 having a resistor R and a capacitor C with a time constant adapted to filter the high frequency excitation component (e.g., PWM) out of the signal 242 to obtain the signal 244.

The resulting signal 244 may then be presented to a minimum value detector 228 which is adapted to provide an output signal 230 indicative of the zero crossing or polarity change of the mutual inductance component of the signal 42. The detected mutual inductance polarity change or zero crossing may then be used to indicate that one of a rotor magnet pole or pole boundary is aligned with the floating phase, in order to determine the rotor position. While the apparatus 220 illustrates one method of determining the motor mutual inductance polarity change or zero crossing, it will be appreciated by those skilled in the art that other zero crossing detection devices may be employed which fall within the scope of the present invention.

Figure 9:
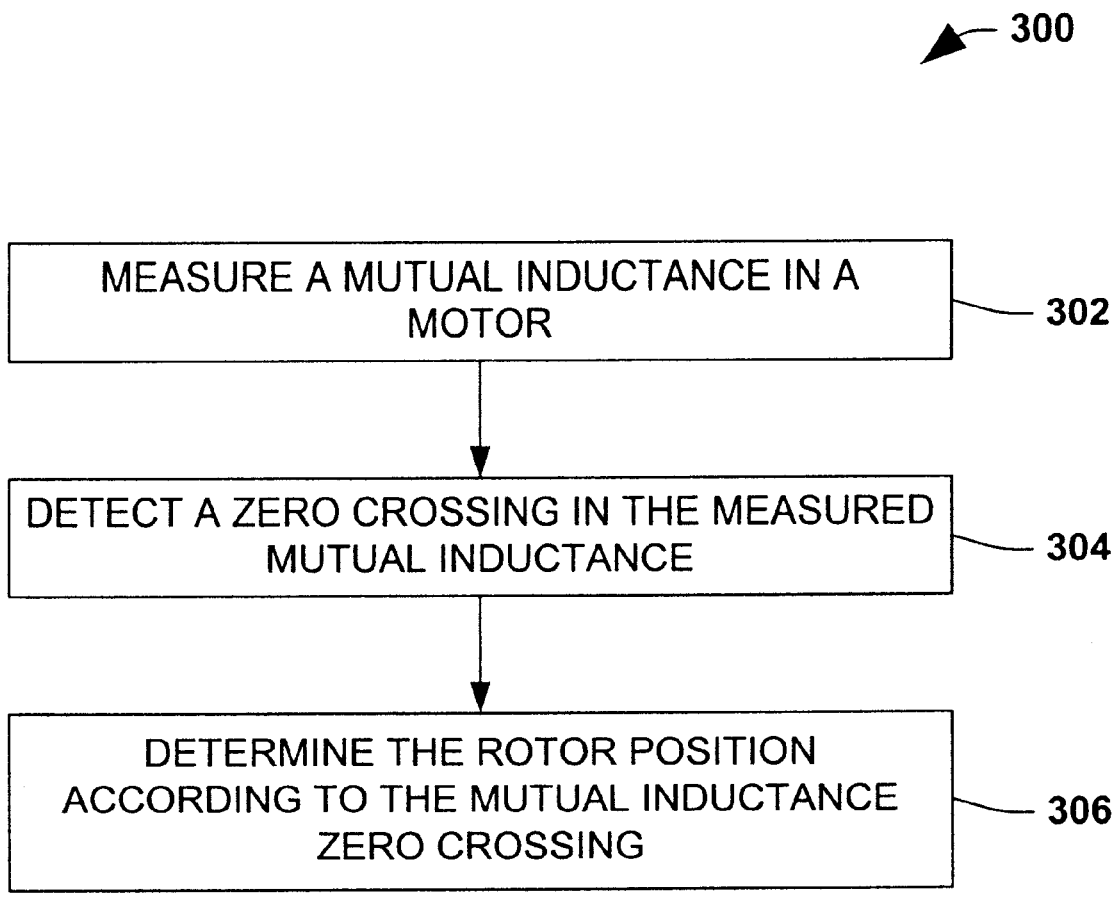
FIG. 9 is a flow diagram illustrating an exemplary method of detecting rotor position in a polyphase electric motor according to yet another aspect of the invention.

Referring now to FIG. 9, an exemplary method 300 of detecting rotor position in a polyphase motor is illustrated in accordance with another aspect of the present invention. Beginning at step 302, a motor mutual inductance (e.g., the equivalent mutual inductance Mbc–Mac of FIG. 6) is measured. Thereafter at step 304, a zero crossing or polarity change is detected in the mutual inductance measured at step 302. The rotor position is then determined at step 306 according to the mutual inductance zero crossing detected at step 304. The method may be employed, for example, using the apparatus 202 of FIG. 8A.

Figure 10:
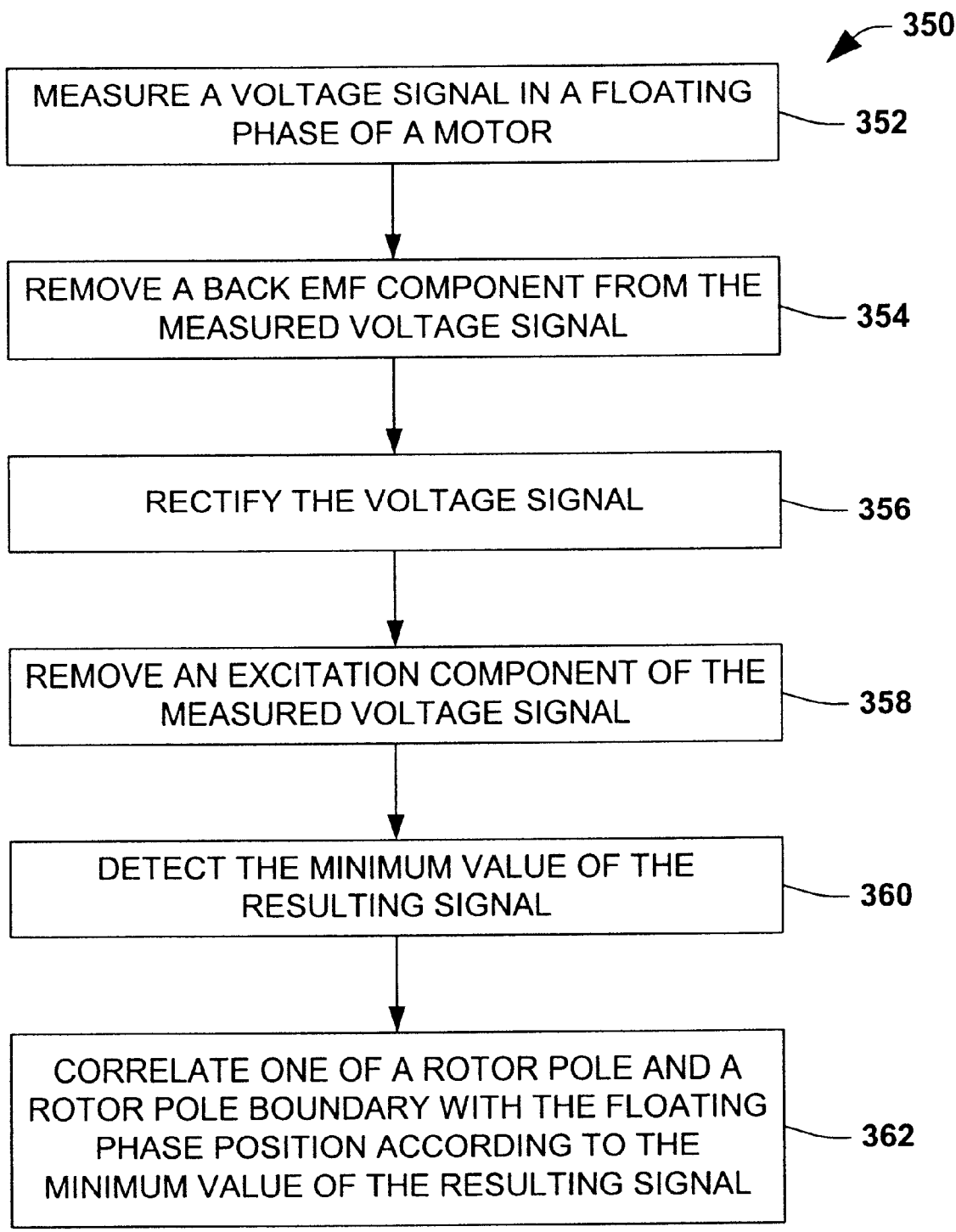
FIG. 10 is a flow diagram illustrating another exemplary method of detecting rotor position in a polyphase electric motor in accordance with the invention.

In FIG. 10, another exemplary method 350 of detecting rotor position in a polyphase motor is illustrated in accordance with another aspect of the present invention. At step 352, a voltage signal (e.g., signal 42 Vc_b–Vcnt_b of FIG. 3D) is measured in a floating or de-energized motor phase when the other phases are energized. This step 352 may, for example, be implemented by the mutual inductance zero crossing detection component 202 of FIG. 8A. At step 354, a back emf component of the signal measured at step 352 is removed (e.g., by the high pass filter 222 in FIG. 8B). The signal is then rectified at step 356 (e.g., using rectifier 224), and an excitation component is removed (e.g., by filter 226) at step 358. Thereafter, a minimum value of the resulting signal is detected at step 360 which represents a zero crossing or polarity reversal (e.g., using detector 228). At step 362, one of a rotor pole and a rotor pole boundary is correlated with the floating phase position according to the minimum value detected at step 360 in order to determine the rotor position.

Figure 11:
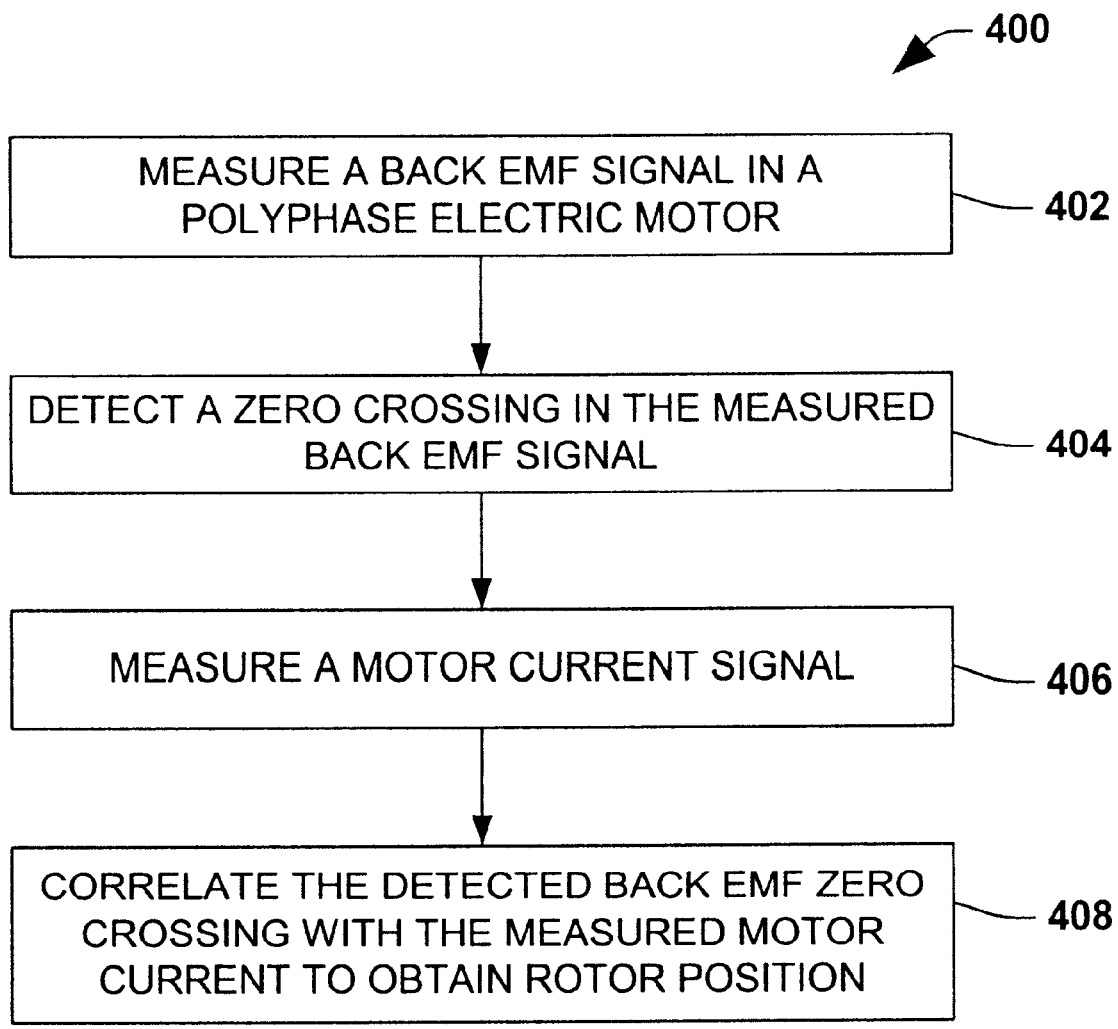
FIG. 11 is a flow diagram illustrating another exemplary method of detecting rotor position in a polyphase electric motor in accordance with another aspect of the invention.

Referring now to FIG. 11, another exemplary method 400 of detecting rotor position in a polyphase electric motor is illustrated in accordance with another aspect of the present invention. At step 402, a back emf signal is measured in a motor, from which a zero crossing is detected at step 404. A motor current is then measured at step 406. The motor current measured at step 406 and the back emf zero crossing detected at step 404 are then correlated at step 408 in order to determine or obtain the rotor position. Referring also to FIG. 7C, the method 400 may be used, for example, to obtain a more accurate determination of rotor position in an electric motor by correlating the current dependency or relationship of an offset in the detected back emf zero crossing or polarity change in accordance with the invention.

Although the invention has been shown and described with respect to a certain preferred applications or implementations, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several implementations, such feature may be combined with one or more other features of the other implementations as may be desired and advantageous for any given or particular application.

What is claimed is:

1. A method of detecting rotor position in a polyphase electric motor, comprising:
   measuring a mutual inductance in the motor by using zero crossing of said polyphase electric motor; and
   determining the rotor position according to the measured mutual inductance,
   wherein determining the rotor position according to the measured mutual inductance comprises:
      detecting a polarity change in the measured mutual inductance; and
      determining the rotor position according to the mutual inductance polarity change.

2. The method of claim 1, wherein measuring a mutual inductance in the motor comprises:
   measuring a voltage signal in a floating phase of the motor;
   filtering low frequency components out of the floating phase voltage signal;
   rectifying the filtered floating phase voltage signal; and
   filtering high frequency components out of the rectified phase voltage signal;
   and wherein detecting a polarity change in the measured mutual inductance comprises detecting the minimum value of the rectified, filtered signal.

3. The method of claim 2, wherein the measured voltage signal comprises a back emf component, a mutual inductance component, and an excitation component, wherein filtering low frequency components out of the floating phase voltage signal comprises removing the back emf component of the measured voltage signal, and wherein filtering high frequency components out of the rectified phase voltage signal comprises removing the excitation component of the measured voltage signal.

4. The method of claim 3, wherein determining the rotor position according to the mutual inductance polarity change comprises correlating one of a rotor pole and a rotor pole boundary with a floating phase position.

5. The method of claim 3, wherein measuring a voltage signal in a floating phase of the motor comprises measuring the voltage signal while the floating phase winding is de-energized, and at least one other phase winding is energized.

6. The method of claim 5, wherein the polyphase electric motor comprises at least three phases, and wherein measuring a voltage signal in a floating phase of the motor comprises measuring the voltage signal while the floating phase winding is de-energized, and the other phase windings are energized.

7. The method of claim 6, wherein the mutual inductance is the equivalent mutual inductance of the energized motor phase windings with respect to the de-energized phase winding.

8. The method of claim 5, wherein determining the rotor position according to the mutual inductance polarity change comprises correlating one of a rotor pole and a rotor pole boundary with a floating phase position.

9. The method of claim 1, wherein determining the rotor position according to the mutual inductance polarity change comprises correlating one of a rotor pole and a rotor pole boundary with a floating phase position.

10. The method of claim 9, wherein the mutual inductance is the equivalent mutual inductance of the energized motor phase windings with respect to the de-energized phase winding.

11. The method of claim 1, wherein the mutual inductance is the equivalent mutual inductance of the energized motor phase windings with respect to the de-energized phase winding.

12. An apparatus for detecting rotor position in a polyphase electric motor, comprising:
    a first circuit adapted to measure a mutual inductance in the motor by using zero crossing of said polyphase electric motor; and
    a second circuit adapted to determine rotor position according to the measured mutual inductance,
    wherein the second circuit is further adapted to detect a polarity change in the measured mutual inductance and to determine the rotor position according to the mutual inductance polarity change.

13. The apparatus of claim 12, wherein the first circuit comprises:
    a sensor adapted to measure a voltage signal in a floating phase of the motor;
    a high pass filter adapted to remove low frequency components from the floating phase voltage signal;
    a rectifier adapted to rectify the filtered floating phase voltage signal; and
    a low pass filter adapted to remove high frequency components from the rectified phase voltage signal;
    and wherein the second circuit is further adapted to detect the minimum value of a signal from the low pass filter.

14. The apparatus of claim 13, wherein the measured voltage signal comprises a back emf component, a mutual inductance component, and an excitation component, wherein the high pass filter removes the back emf component of the measured voltage signal, and wherein the low pass filter removes the excitation component of the measured voltage signal.

15. The apparatus of claim 13, wherein the second circuit comprises a third circuit adapted to correlate one of a rotor pole and a rotor pole boundary with the floating phase position.

16. The apparatus of claim 13, wherein the first circuit is adapted to measure the voltage signal while the floating phase winding is de-energized and at least one other phase winding is energized.

17. The apparatus of claim 16, wherein the polyphase electric motor comprises at least three phases, and wherein the first circuit is adapted to measure the voltage signal while the floating phase winding is de-energized and the other phase windings are energized.

18. The apparatus of claim 16, wherein the second circuit is adapted to correlate one of a rotor pole and a rotor pole boundary with the floating phase position.

19. The apparatus of claim 12, wherein the second circuit is adapted to correlate one of a rotor pole and a rotor pole boundary with the floating phase position.

20. The apparatus of claim 19, wherein the mutual inductance is the equivalent mutual inductance of the energized motor phase windings with respect to the de-energized phase winding.

21. The apparatus of claim 12, wherein the mutual inductance is the equivalent mutual inductance of the energized motor phase windings with respect to the de-energized phase winding.

* * * * *